United States Patent
Choi et al.

(10) Patent No.: US 9,819,381 B2
(45) Date of Patent: Nov. 14, 2017

(54) ELECTRONIC DEVICE INCLUDING PROTECTIVE MEMBER

(71) Applicant: Samsung Electronics Co., Ltd., Gyeonggi-do (KR)

(72) Inventors: Jong-Chul Choi, Gyeonggi-do (KR); Li-Yeon Kang, Gyeonggi-do (KR); Kwangmin Gil, Gyeonggi-do (KR); Jinkeun Park, Daegu (KR); Min-Woo Yoo, Gyeonggi-do (KR); Sangsoo Lee, Seoul (KR); Min-Jong Lim, Gyeonggi-do (KR); Jae-Hoon Choi, Gyeongsangbuk-do (KR); Chang-Ryong Heo, Gyeonggi-do (KR); Dongsub Kim, Gyeonggi-do (KR); Sangkyu Lee, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/292,258

(22) Filed: Oct. 13, 2016

(65) Prior Publication Data

US 2017/0111076 A1   Apr. 20, 2017

(30) Foreign Application Priority Data

Oct. 14, 2015 (KR) ........................ 10-2015-0143521

(51) Int. Cl.
*H04B 1/3888* (2015.01)
*H04M 1/18* (2006.01)
*H04B 1/38* (2015.01)

(52) U.S. Cl.
CPC ............. *H04B 1/3888* (2013.01); *H04B 1/38* (2013.01); *H04M 1/185* (2013.01)

(58) Field of Classification Search
CPC .......................... H04M 1/185; H04M 2250/12
USPC ............ 455/550.1, 575.1, 575.8, 90.3, 67.11
See application file for complete search history.

(56) References Cited

U.S. PATENT DOCUMENTS

| | | | |
|---|---|---|---|
| 7,447,532 B2 | 11/2008 | Hsu | |
| 7,471,509 B1 | 12/2008 | Oliver | |
| 8,113,494 B2 | 2/2012 | Sunder | |
| 8,330,305 B2 | 12/2012 | Hart et al. | |
| 8,816,977 B2 | 8/2014 | Rothkopf et al. | |
| 8,903,519 B2 | 12/2014 | King et al. | |

(Continued)

FOREIGN PATENT DOCUMENTS

| | | |
|---|---|---|
| JP | 2002-247153 A | 8/2002 |
| JP | 2008-67160 A | 3/2008 |

(Continued)

*Primary Examiner* — John J Lee
(74) *Attorney, Agent, or Firm* — Cha & Reiter, LLC

(57) ABSTRACT

An electronic device may include: at least one protective member disposed in at least one area of the electronic device; at least one sensor configured to detect the drop of the electronic device; a protective member driving module configured to activate the protective member to change the shape of the protective member according to whether the drop of the electronic device is detected; and at least one processor configured to receive a drop sensing signal detected by the sensor and to control the protective member driving module to change the shape of the protective member.

18 Claims, 24 Drawing Sheets

(56) References Cited

U.S. PATENT DOCUMENTS

| | | | |
|---|---|---|---|
| 2013/0027202 A1* | 1/2013 | Lai | G06F 1/1656 340/540 |
| 2013/0073095 A1* | 3/2013 | King | H04M 1/185 700/279 |
| 2014/0028614 A1 | 1/2014 | Bae et al. | |
| 2014/0080552 A1 | 3/2014 | Yoon et al. | |
| 2014/0176295 A1 | 6/2014 | Hung et al. | |
| 2015/0077363 A1 | 3/2015 | Yairi et al. | |
| 2015/0077364 A1 | 3/2015 | Parthasarathy et al. | |
| 2015/0103018 A1* | 4/2015 | Kamin-Lyndgaard | G09G 5/006 345/173 |

FOREIGN PATENT DOCUMENTS

| | | |
|---|---|---|
| JP | 2008-242210 A | 10/2008 |
| JP | 2009-104407 A | 5/2009 |
| JP | 2013-120424 A | 6/2013 |
| JP | 3185639 U | 8/2013 |
| KR | 10-1113661 B1 | 2/2012 |
| KR | 10-2013-0046075 A | 5/2013 |
| KR | 10-2014-0016098 A | 2/2014 |
| KR | 10-2014-0035620 A | 3/2014 |

\* cited by examiner

ELECTRONIC DEVICE INCLUDING PROTECTIVE MEMBER

CLAIM OF PRIORITY

This application claims the priority under 35 U.S.C. §119(a) to Korean Application Serial No. 10-2015-0143521, which was filed in the Korean Intellectual Property Office on Oct. 14, 2015, the entire contents of which are hereby incorporated by reference.

TECHNICAL FIELD

The present disclosure generally relates to an electronic device and more particularly to an electronic device that includes a protective member.

BACKGROUND

Portable electronic devices have become essential items that provide their owners with a variety of functions. Device makers attempt to design these devices to have an appealing aesthetic while being durable and resistant to external impacts resulting from drops, etc.

SUMMARY

According to various embodiments, electronic devices have increased portability as they are being made slimmer and lighter. Some electronic devices include displays and/or windows stacked thereon that occupy almost an entire surface area of an electronic device may be particularly vulnerable to external impacts, such as dropping, etc.

In order to solve the problem, resilient protective covers, which are provided separately from electronic devices, have been mounted on the electronic devices, but the protective covers may increase the volume or size of the electronic devices, which adversely affects the portability and aesthetic of the electronic devices.

Various embodiments may provide an electronic device that includes a protective member.

Various embodiments may provide an electronic device that includes a protective member that is implemented to prevent, in advance, a display and/or a window from being damaged by an external impact (such as dropping, etc.).

Various embodiments may provide an electronic device that includes a protective member that is capable of preventing the electronic device from being damaged by an external impact without damages to the aesthetics of the exterior of the electronic device.

An electronic device, according to various embodiments, may include: at least one protective member disposed in at least one area of the electronic device; at least one sensor configured to detect a drop of the electronic device and to generate a drop sensing signal when the drop is detected; a protective member driving module configured to activate the protective member to change the shape of the protective member according to whether the electronic device is dropped; and at least one processor configured to receive a drop sensing signal detected by the sensor and to control the protective member driving module to change the shape of the protective member.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
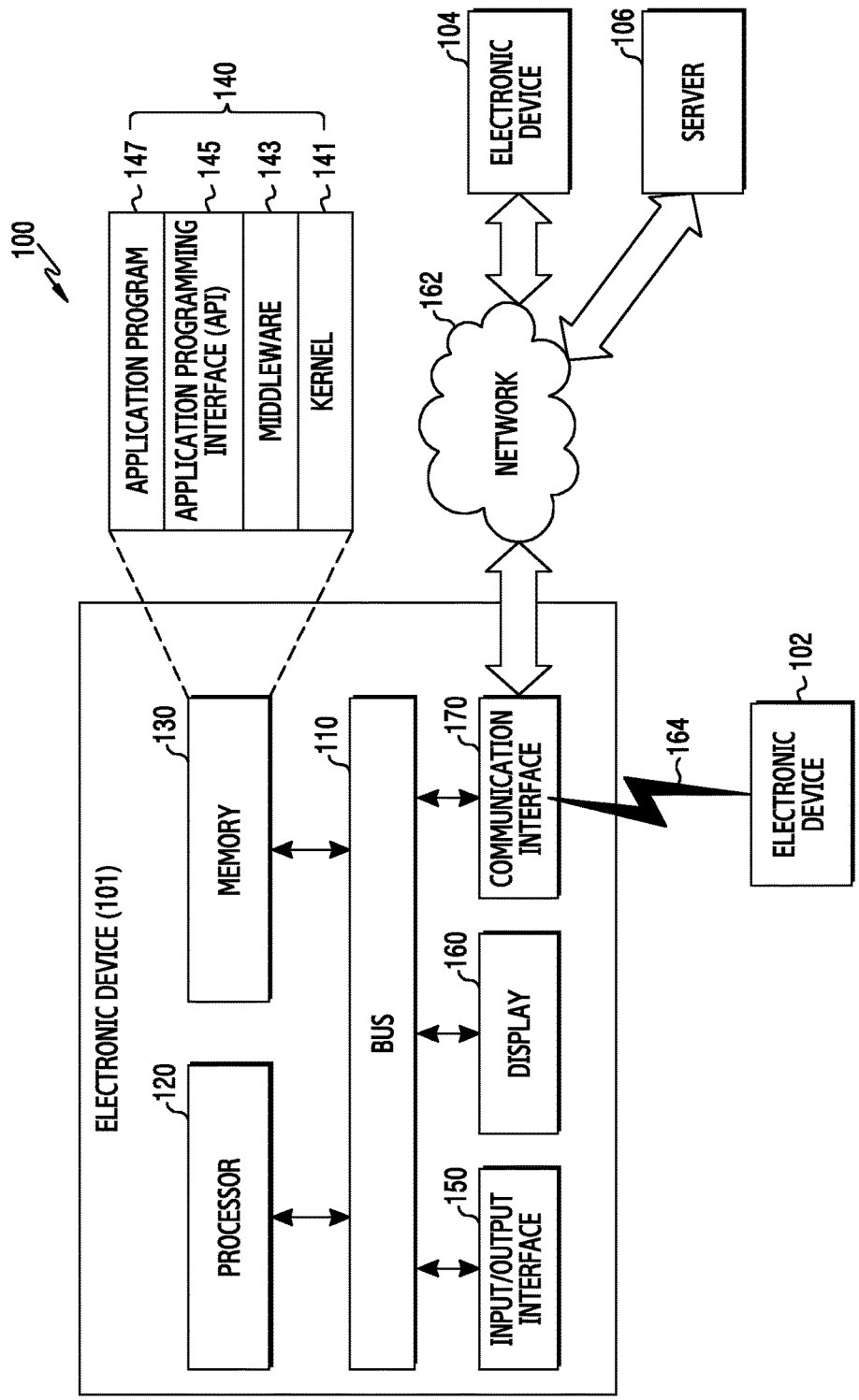
FIG. 1 illustrates a network environment that includes an electronic device according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of certain embodiments of the present disclosure as defined by the claims and their equivalents. It includes specific details to assist in that understanding but these are to be regarded merely as examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "include" and "may include" used herein are intended to indicate the presence of a corresponding function, operation, or constitutional element disclosed herein, and are not intended to limit the presence of one or more functions, operations, or constitutional elements. In addition, the terms "include" and "have" are intended to indicate that characteristics, numbers, operations, constitutional elements, and elements disclosed in the specification or combinations thereof exist. However, additional possibilities of one or more other characteristics, numbers, operations, constitutional elements, elements or combinations thereof may exist.

As used herein, the expression "or" includes any and all combinations of words enumerated together. For example, "A or B" may include either A or B or may include both A and B.

Although expressions used in various embodiments of the present disclosure, such as "$1^{st}$", "$2^{nd}$", "first", "second" may be used to express various constituent elements of the various embodiments of the present disclosure, these expressions are not intended to limit the corresponding constituent elements. For example, the above expressions are not intended to limit an order or an importance of the corresponding constituent elements. The above expressions may be used to distinguish one constituent element from another constituent element. For example, a first user device and the second user device are both user devices, and indicate different user devices. For example, a first constituent element may be referred to as a second constituent element, and similarly, the second constituent element may be referred to as the first constituent element without departing from the scope of the present disclosure.

When an element is mentioned as being "connected" to or "accessing" another element, this may mean that it is directly connected to or accessing the other element, or there may be intervening elements present between the two elements. On the other hand, when an element is mentioned as being "directly connected" to or "directly accessing" another element, it is to be understood that there are no intervening elements present.

The term "module" as used herein may imply a unit including one of hardware, software, and firmware, or a combination thereof. The term "module" may be interchangeably used with terms, such as unit, logic, logical block, component, circuit, and the like. A module as described herein may be a minimum unit of an integrally constituted component or may be a part thereof. The module may be a minimum unit for performing one or more functions or may be a part thereof. The module may be mechanically or electrically implemented. For example, the module as described herein includes at least one of an application-specific IC (ASIC) chip, a field-programmable gate arrays (FPGAs), and a programmable-logic device, which are known or will be developed and which may perform certain operations.

By the term "substantially" it is meant that the recited characteristic, parameter, or value need not be achieved exactly, but that deviations or variations, including, but not limited to, for example, tolerances, measurement errors, measurement accuracy limitations and other factors known to persons of ordinary skill in the art, may occur in amounts that do not preclude the effect the characteristic was intended to provide.

Unless otherwise defined, all terms, including technical and scientific terms, used herein have the same meaning as commonly understood by those of ordinary skill in the art to which various embodiments of the present disclosure belong. It will be further understood that terms, such as those defined in commonly used dictionaries, should be interpreted as having meanings that are consistent with their meaning in the context of the relevant art and the various embodiments of the present disclosure, and should not be interpreted in an idealized or overly formal sense unless expressly so defined herein.

An electronic device as used herein may be a device including, but not limited to, an antenna capable of performing a communication function in at least one frequency band. For example, the electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, and a wearable device (e.g., a head-mounted-device (HMD), such as electronic glasses, electronic clothes, an electronic bracelet, an electronic necklace, an electronic appcessory, an electronic tattoo, a smart watch, and/or the like).

The electronic device may be a smart home appliance having an antenna. For example, the smart home appliance may include at least one of a television (TV), a digital versatile disc (DVD) player, an audio player, a refrigerator, an air conditioner, a cleaner, an oven, a microwave oven, a washing machine, an air purifier, a set-top box, a TV box (e.g., Samsung HomeSync®, Apple TV®, or Google TV®), a game console, an electronic dictionary, an electronic key, a camcorder, and an electronic picture frame.

The electronic device may include an antenna and may be or include one of various medical devices (e.g., magnetic resonance angiography (MRA), magnetic resonance imaging (MRI), computed tomography (CT), imaging equipment, an ultrasonic instrument, and the like), a navigation device, a global positioning system (GPS) receiver, an event data recorder (EDR), a flight data recorder (FDR), a car infotainment device, electronic equipment for a ship (e.g., a vessel navigation device, a gyro compass, and the like), avionics, a security device, a car head unit, an industrial or domestic robot, an automatic teller machine (ATM), a point of sales (POS) device, and the like.

The electronic device may be part of at least one of an item of furniture or a building/structure including an antenna. The electronic device may be an electronic board, an electronic signature input device, a projector, or any of various measurement machines (e.g., water supply, electricity, gas, a propagation measurement machine, and the like).

The electronic device may be one or more combinations of the aforementioned various devices. In addition, the electronic device may be a flexible device. Moreover, the electronic device is not limited to the aforementioned devices.

Hereinafter, an electronic device according to various embodiments will be described with reference to the accompanying drawings. The term 'user' used in the various embodiments may refer to a person who uses the electronic device or a device which uses the electronic device (e.g., an artificial intelligence (AI) electronic device).

FIG. 1 illustrates a view of a network environment including an electronic device, according to an embodiment of the present disclosure.

Referring to FIG. 1, the electronic device 100 may include a bus 110, a processor 120, a memory 130, an input/output interface 150, a display 160, and/or a communication interface 170. In various embodiments of the present disclosure, the electronic device 100 can omit at least one of the components or further include another component(s).

The bus 110 may include a circuit for connecting the components (e.g., the processor 120, the memory 130, the input/output interface 150, the display 160, and the communication interface 170) and delivering communications (e.g., a control message) therebetween.

The processor 120 may include one or more of a central processing unit (CPU), an application processor (AP), and a communication processor (CP). The processor 120 processes an operation or data on control of and/or communication with another component of the electronic device 100.

The processor 120, which is connected to the LTE network, may determine whether a call is connected over the CS service network using caller identification information (e.g., a caller phone number) of the CS service network (e.g., the 2G/3G network). For example, the processor 120 may receive incoming call information (e.g., a CS notification message or a paging request message) of the CS service network over the LTE network (e.g., circuit-switched fallback (CSFB)). For example, the processor 120 being connected to the LTE network may receive incoming call information (e.g., a paging request message) over the CS service network (e.g., single radio LTE (SRLTE)).

When receiving the incoming call information (e.g., a CS notification message or a paging request message) of the CS service network over the LTE network, the processor 120 may obtain caller identification information from the incoming call information. The processor 120 displays the caller identification information on the display 160. The processor 120 determines whether to connect the call based on input information corresponding to the caller identification information displayed on the display 160. For example, when detecting input information corresponding to an incoming call rejection, through the input/output interface 150, the processor 120 may restrict the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 may determine whether to connect the call by comparing the caller identification information with a reception control list. For example, when the caller identification information is included in a first reception control list (e.g., a blacklist), the processor 120 restricts the voice call connection and maintains the connection to the LTE network. For example, when the caller identification information is not included in the first reception control list (e.g., the blacklist), the processor 120 may connect the voice call by connecting to the CS service network. For example, when the caller identification information is included in a second reception control list (e.g., a white list), the processor 120 may connect the voice call by connecting to the CS service network.

When receiving the incoming call information (e.g., a paging request message) of the CS service network over the LTE network, the processor 120 may send an incoming call response message (e.g., a paging response message) to the CS service network. The processor 120 may suspend the LTE service and receive the caller identification information (e.g., a Circuit-switched Call (CC) setup message) from the CS service network. The processor 120 determines whether to connect the call by comparing the caller identification information with the reception control list. For example, when the caller identification information may be included in the first reception control list (e.g., the blacklist), the processor 120 may restrict the voice call connection and resume the LTE network connection. For example, when the caller identification information is not included in the first reception control list (e.g., the blacklist), the processor 120 may connect the voice call by connecting to the CS service network. For example, when the caller identification information is included in the second reception control list (e.g., the white list), the processor 120 may connect the voice call by connecting to the CS service network.

The memory 130 can include volatile and/or nonvolatile memory. The memory 130 may store commands and/or data (e.g., the reception control list) relating to at least another component of the electronic device 100. The memory 130 may store software and/or a program 140. The program 140 may include, for example, a kernel 141, middleware 143, an application programming interface (API) 145, and/or application programs (or "applications") 147. At least some of the kernel 141, the middleware 143, and/or the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 100 to control or manage the system resources.

The middleware 143 may function as an intermediary for allowing the API 145 or the applications 147 to communicate with the kernel 141 to exchange data.

In addition, the middleware 143 may process one or more task requests received from the applications 147 according to priorities thereof. For example, the middleware 143 assigns priorities for using the system resources (e.g., the bus 110, the processor 120, the memory 130, etc.) of the electronic device 100, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, etc.

The input/output interface 150 functions as an interface that transfers instructions or data input from a user or another external device to the other element(s) of the electronic device 100. Furthermore, the input/output interface 150 may output the instructions or data received from the other element(s) of the electronic device 100 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content (e.g., a text, images, videos, icons, symbols, etc.) for the user. The display 160 may include a touch screen and may be responsive to, for example, a touch, a gesture, proximity, a hovering input, etc., using an electronic pen or the user's body part. The display 160 may display, for example, a web page.

The communication interface 170 can establish a communication between the electronic device 100 and an external electronic device (e.g., a first external electronic device 102, a second external electronic device 104, or a server 106). For example, the communication interface 170 can communicate with the first external electronic device 102, the second external electronic device 104, or the server 106 in connection to the network 162 through wireless communication or wired communication. For example, the wireless communication can conform to a cellular communication protocol including at least one of LTE, LTE-Advanced (LTE-A), CDMA, WCDMA, universal mobile telecommunication system (UMTS), WiBro, and GSM.

The wired communication can include at least one of universal serial bus (USB), high definition multimedia interface (HDMI), recommended standard 232 (RS-232), and plain old telephone service (POTS).

The network 162 can include at least one of telecommunications networks, for example, a computer network (e.g., local area network (LAN) or wide area network (WAN)), Internet, and a telephone network.

The electronic device 100 may provide the LTE service in the single radio environment by use of at least one module functionally or physically separated from the processor 120. Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member may be formed of a single material.

Each of the first and second external electronic devices 102 and 104 may be a type of device that is the same as or different from the electronic device 101. According to one embodiment, the server 106 may include a group of one or more servers. According to various embodiments, all or some of the operations to be executed by the electronic device 101 may be executed by another electronic device or a plurality of other electronic devices (e.g., the electronic devices 102 and 104 or the server 106). According to one embodiment, in the case where the electronic device 101 may perform a certain function or service automatically or by request, the electronic device 101 may request some functions that are associated therewith from the other electronic devices (e.g., the electronic devices 102 and 104 or the server 106) instead of or in addition to executing the function or service by itself. The other electronic devices (e.g., the electronic devices 102 and 104 or the server 106) may execute the requested functions or additional functions, and may transmit the results to the electronic device 101. The electronic device 101 may provide the requested functions and/or services by processing the received results. For this purpose, for example, a cloud computing technique, a distributed computing technique, or a client-server computing technique may be used.

Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Figure 2:
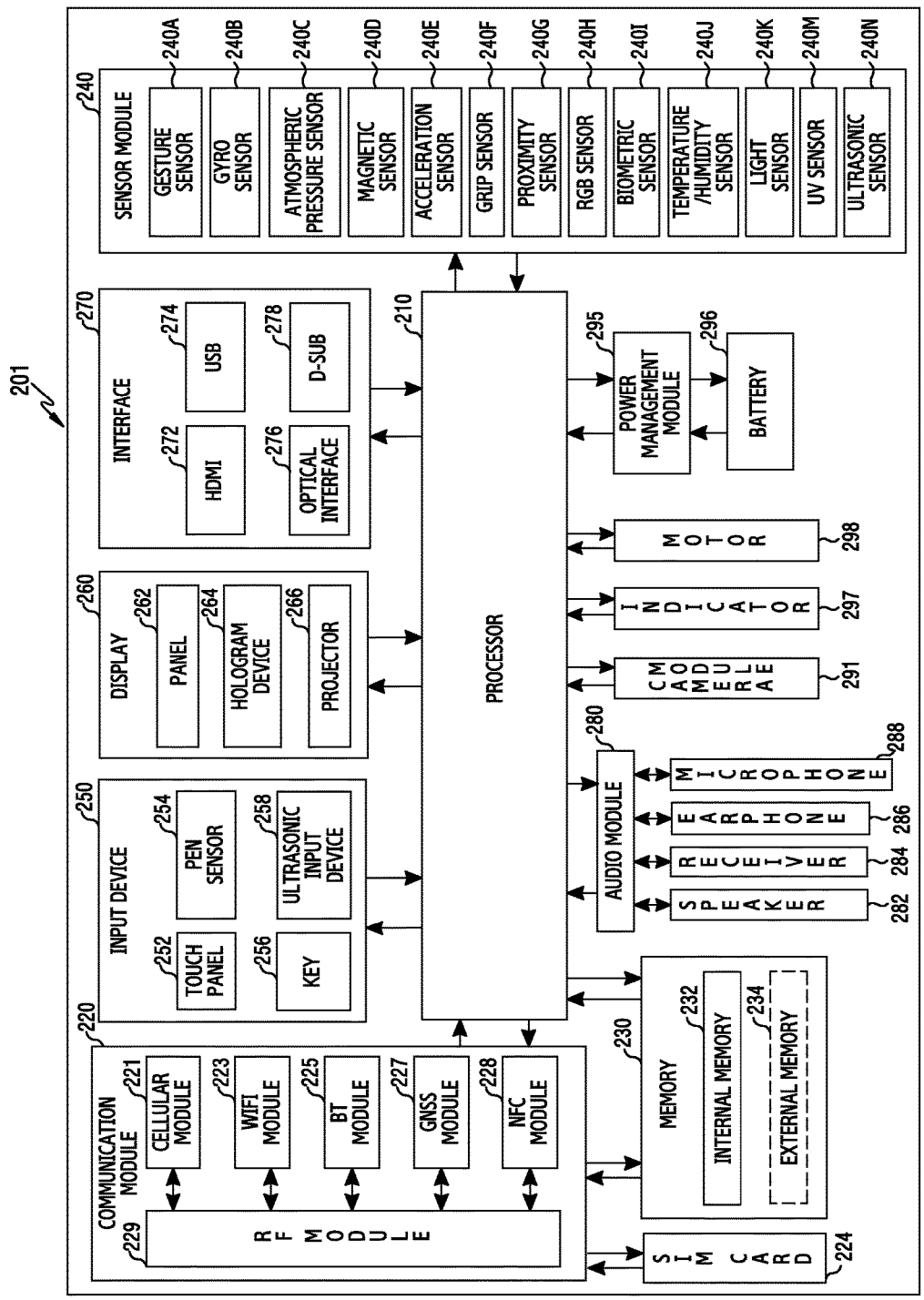
FIG. 2 is a block diagram of an electronic device according to various embodiments of the present disclosure.

FIG. 2 illustrates a diagram of a configuration of an electronic device 201, according to an embodiment of the present disclosure.

Referring to FIG. 2, a configuration of the electronic device 201 is provided. The electronic device 201 may include all or some of the components described with reference to the electronic device 101 of FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and/or a motor 298.

The AP 210 may control a plurality of hardware or software elements connected to the AP 210 by driving an operating system (OS) or an application program. The AP 210 processes a variety of data, including multimedia data, and performs arithmetic operations. The AP 210 may be implemented, for example, with a system on chip (SoC). The AP 210 may further include a graphical processing unit (GPU).

The communication module 220 may perform data transmission/reception in communication between the external electronic device 104 or the server 106 which may be connected with the electronic device 201 through the network 162. The communication module 220 includes a cellular module 221, a Wi-Fi module 223, a BT module 225, a global navigation satellite system (GNSS) or GPS module 227, a NFC module 228, and a radio frequency (RF) module 229.

The cellular module 221 provides a voice call, a video call, a text service, an internet service, and the like, through a communication network (e.g., LTE, LTE-A, CDMA, WCDMA, UMTS, WiBro, and GSM, and the like). In addition, the cellular module 221 may identify and authenticate the electronic device 201 within the communication network by using the SIM card 224. The cellular module 221 may perform at least some of functions that can be provided by the AP 210. For example, the cellular module 221 may perform at least some multimedia control functions.

The cellular module 221 may include a communication processor (CP). Further, the cellular module 221 may be implemented, for example, with an SoC. Although elements, such as the cellular module 221 (e.g., the CP), the memory 230, and the power management module 295 are illustrated as separate elements with respect to the AP 210 in FIG. 2, the AP 210 may also be implemented such that at least one part (e.g., the cellular module 221) of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which may be received from at least one of different elements or generated by at least one of different elements, into the non-volatile memory.

Each of the Wi-Fi module 223, the BT module 225, the GNSS module 227, and/or the NFC module 228 may include a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least some (e.g., two or more) of the cellular module 221, the Wi-Fi module 223, the BT module 225, the GNSS module 227, and the NFC module 228 may be included in one integrated chip (IC) or IC package. For example, at least some processors corresponding to the cellular module 221, the Wi-Fi module 223, the BT module 225, the GNSS module 227, and the NFC module 228 (e.g., a communication processor corresponding to the cellular module 221 and a Wi-Fi processor corresponding to the Wi-Fi module 223) may be implemented with an SoC.

The RF module 229 may transmit/receive data, for example an RF signal. The RF module 229 may include, for example, a transceiver, a power amp module (PAM), a frequency filter, a low noise amplifier (LNA), and the like. In addition, the RF module 229 may further include a component for transmitting/receiving a radio wave on a free space in wireless communication, for example, a conductor, a conducting wire, and the like. Although it is illustrated in FIG. 2 that the cellular module 221, the Wi-Fi module 223, the BT module 225, the GNSS module 227, and the NFC module 228 share one RF module 229, a at least one of the cellular module 221, the Wi-Fi module 223, the BT module 225, the GNSS module 227, the NFC module 228 may transmit/receive an RF signal via a separate RF module.

The SIM card 224 may be inserted into a slot formed at a specific location of the electronic device 201. The SIM card 224 includes unique identification information (e.g., an integrated circuit card identifier (ICCID)) or subscriber information (e.g., an international mobile subscriber identity (IMSI)).

The memory 230 includes an internal memory 232 or an external memory 234.

The internal memory 232 may include, for example, at least one of a volatile memory (e.g., a dynamic random access memory (DRAM), a static RAM (SRAM), a synchronous dynamic RAM (SDRAM), and the like) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like). The internal memory 232 may be a solid state drive (SSD).

The external memory 234 may include a flash drive, and may further include, for example, compact flash (CF), secure digital (SD), micro-SD, mini-SD, extreme digital (xD), memory stick, and the like. The external memory 234 may be operatively coupled to the electronic device 201 via various interfaces.

The electronic device 201 may further include a storage unit (or a storage medium), such as a hard drive.

The sensor module 240 may measure a physical quantity or detect an operation state of the electronic device 201, and may convert the measured or detected information into an electric signal. The sensor module 240 may include, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination/illuminance sensor 240K, an ultraviolet (UV) sensor 240M and ultrasonic sensor 240N.

The ultrasonic sensor 240N may include at least one ultrasonic transducer. The ultrasonic sensor 240N may include a contact type ultrasonic transducer (for example, an enclosed type ultrasonic transducer) and a non-contact type ultrasonic transducer (for example, a resonant type ultrasonic transducer), each of which are described in greater detail below. The contact type ultrasonic transducer and the non-contact type ultrasonic transducer may be controlled to be exclusively or simultaneously operated under a control of the processors 120, 220.

Additionally or alternatively, the sensor module 240 may include, for example, an E-node sensor, an electromyography (EMG) sensor, an electroencephalogram (EEG) sensor, an electrocardiogram (ECG) sensor, a fingerprint sensor, and/or the like.

The sensor module 240 may further include a control circuit for controlling at least one or more sensors included therein.

The input device 250 may include a touch panel 252, a (digital) pen sensor 254, a key 256, and/or an ultrasonic input unit 258.

The touch panel 252 may recognize a touch input, for example, by using at least one of an electrostatic type configuration, a pressure-sensitive type configuration, and/or an ultrasonic type configuration. The touch panel 252 may further include a control circuit. In the case where the touch panel is of the electrostatic type, not only is physical contact recognition possible, but proximity recognition is also possible. The touch penal 252 may further include a tactile layer, which may provide the user with a tactile reaction.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves generated by an input tool through the microphone 288, and may confirm data corresponding to the detected ultrasonic waves.

The (digital) pen sensor 254 may be implemented, for example, by using the same or similar method of receiving a touch input of the user or by using an additional sheet for recognition.

The key 256 may be, for example, a physical button, an optical key, a keypad, and/or a touch key.

The ultrasonic input unit 258 may be a device by which the electronic device 201 detects a reflected sound wave through a microphone 288 and is capable of radio recognition. For example, an ultrasonic signal, which may be generated by using a pen, may be reflected off of an object and detected by the microphone 288.

The electronic device 201 may use the communication module 220 to receive a user input from an external device (e.g., a computer or a server) connected thereto.

The display 260 may include a panel 262, a hologram 264, and/or a projector 266.

The panel 262 may be, for example, a liquid-crystal display (LCD), an active-matrix organic light-emitting diode (AM-OLED), and/or the like. The panel 262 may be implemented, for example, in a flexible, transparent, or wearable manner. The panel 262 may be constructed as one module with the touch panel 252.

The hologram device 264 may use an interference of light and may display a stereoscopic image in the air.

The projector 266 may display an image by projecting a light beam onto a screen. The screen may be located inside or outside the electronic device 201.

The display 260 may further include a control circuit for controlling the panel 262, the hologram device 264, or the projector 266.

The interface 270 may include, for example, an HDMI 272, a USB 274, an optical communication interface 276, and/or a D-subminiature (D-sub) 278. The interface 270 may be included, for example, in the communication interface 160 of FIG. 1. Additionally or alternatively, the interface 270 may include, for example, mobile high-definition link (MHL), SD/multi-media card (MMC) and/or infrared data association (IrDA).

The audio module 280 may bilaterally convert a sound and an electric signal. At least some elements of the audio module 280 may be included in the input/output interface 150 of FIG. 1. The audio module 280 may convert sound information which is input or output through a speaker 282, a receiver 284, an earphone 286, the microphone 288, and/or the like.

The speaker 282 may output a signal of an audible frequency band and a signal of an ultrasonic frequency band. Reflected waves of an ultrasonic signal emitted from the speaker 282 may be received, or a signal of an external audible frequency band may also be received.

The camera module 291 may be a device for image and/or video capturing, and may include one or more image sensors (e.g., a front sensor or a rear sensor), a lens, an image signal processor (ISP), and/or a flash (e.g., an LED or a xenon lamp). In certain instances, it may prove advantageous to include two or more camera module.

The power management module 295 manages power of the electronic device 201. The power management module 295 may include a power management integrated circuit (PMIC), a charger IC, or a battery gauge.

The PMIC may be placed inside an IC or SoC semiconductor. Charging is classified into wired charging and wireless charging. The charger IC may charge a battery and may prevent an over-voltage or over-current flow from a charger. The charger IC may include a charger IC for at least one of the wired charging and the wireless charging.

The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge may measure, for example, a residual quantity of the battery 296 and a voltage, current, and/or temperature during charging. The battery 296 stores or generates electricity and supplies power to the electronic device 201 by using the stored or generated electricity. The battery 296 may include a rechargeable battery or a solar battery.

The indicator 297 may indicate a specific state, for example, a booting state, a message state, a charging state, and/or the like, of the electronic device 201 or a part thereof (e.g., the AP 210).

The motor 298 may convert an electric signal into a mechanical vibration.

The electronic device 201 may include a processing unit (e.g., a GPU) for supporting mobile TV. The processing unit for supporting mobile TV processes media data according to a protocol of, for example, digital multimedia broadcasting (DMB), digital video broadcasting (DVB), media flow, and/or the like.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of a device (e.g., modules or functions thereof) or method (e.g., operations) may be implemented with an instruction stored in a computer-readable storage media for example. The instruction may be executed by the processor 210, to perform a function corresponding to the instruction. The computer-readable storage media may be, for example, the memory 230. At least some parts of the programming module may be implemented (e.g., executed), for example, by the processor 210. At least some parts of the programming module may include modules, programs, routines, a set of instructions, processes, and the like, for performing one or more functions.

Figure 3:
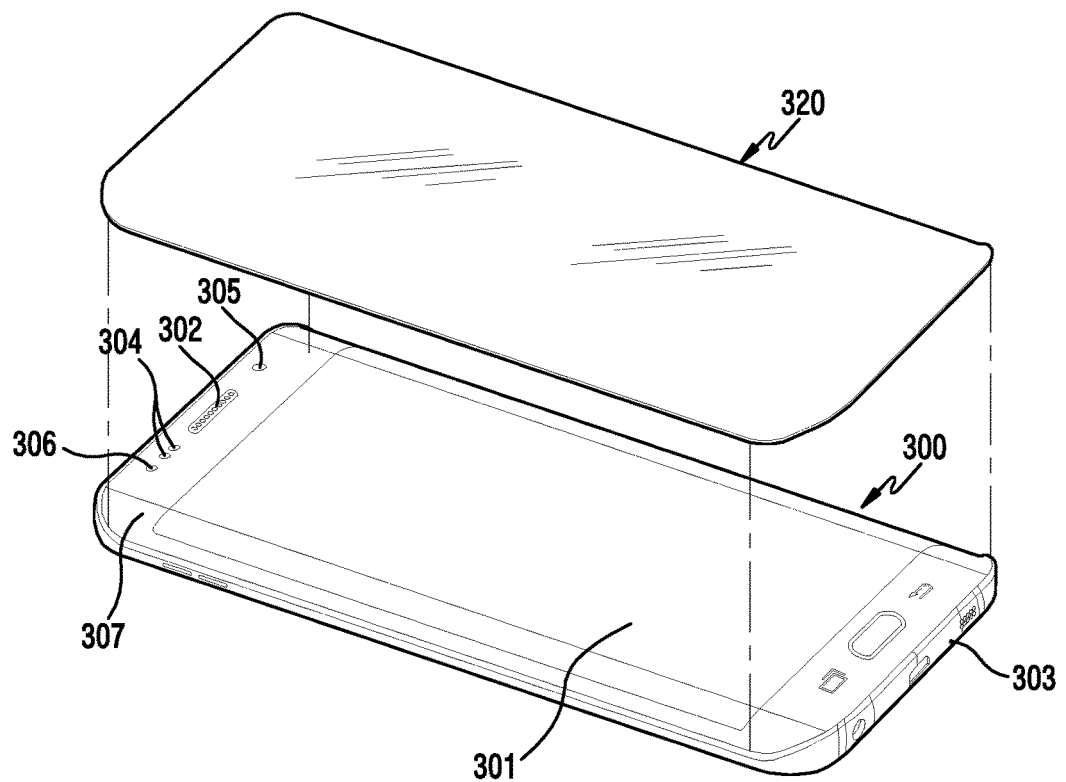
FIG. 3 is a front perspective view of an electronic device having a protective member applied thereto according to various embodiments of the present disclosure.

FIG. 3 is a front perspective view of an electronic device having a protective member applied thereto according to various embodiments of the present disclosure. The electronic device 300 of FIG. 3 may be an embodiment of an electronic device that is similar to, or different from, the electronic device 101 of FIG. 1 and/or the electronic device 201 of FIG. 2.

Referring to FIG. 3, a display 301 may be installed on a front surface 307 of the electronic device 300. A speaker device 302 for receiving a counterpart's speech may be installed on the upper side of the display 301. A microphone device 303 for transmitting an electronic device user's speech to a counterpart may be installed on the lower side of the display 301.

According to an embodiment, components for performing various functions of the electronic device 300 may be disposed around the speaker device 302. The components may include at least one sensor module 304. The sensor module 304 may include, for example, at least one of an illuminance sensor (e.g., optical sensor), a proximity sensor, an infrared sensor, and an ultrasonic sensor. According to an embodiment, the components may include a camera device 305. According to an embodiment, the components may include an LED indicator 306 for informing a user of state information of the electronic device 300.

According to various embodiments, the protective member 320 formed of a transparent film material may be stacked on the front 307 of the electronic device 300 in which the display 301 is included. According to an embodiment, the protective member 320 may include a transparent polymer film that may be activated by a tactile layer that operates under the control of a tactile layer controller disposed within the electronic device 300. According to an embodiment, the tactile layer may be controlled by the tactile layer controller, or may operate under the control of a processor of the electronic device. According to an embodiment, the tactile layer may include fluid (e.g., gas, liquid (e.g., oil), etc.) that is forcibly introduced into at least a part of the protective member by a micro-motor. According to an embodiment, the protective member 320 may include a raised portion that selectively expands upward in a specified position by the fluid that is pressed in the tactile layer.

According to various embodiments, the electronic device 300 may detect its dropping state and may control the tactile layer controller according to the detected dropping state to form at least one raised portion on the top of the protective member 320 according to the driving of the tactile layer. According to an embodiment, the raised portion may serve as a buffer member when the electronic device 300 is dropped on the ground.

Figure 4A:
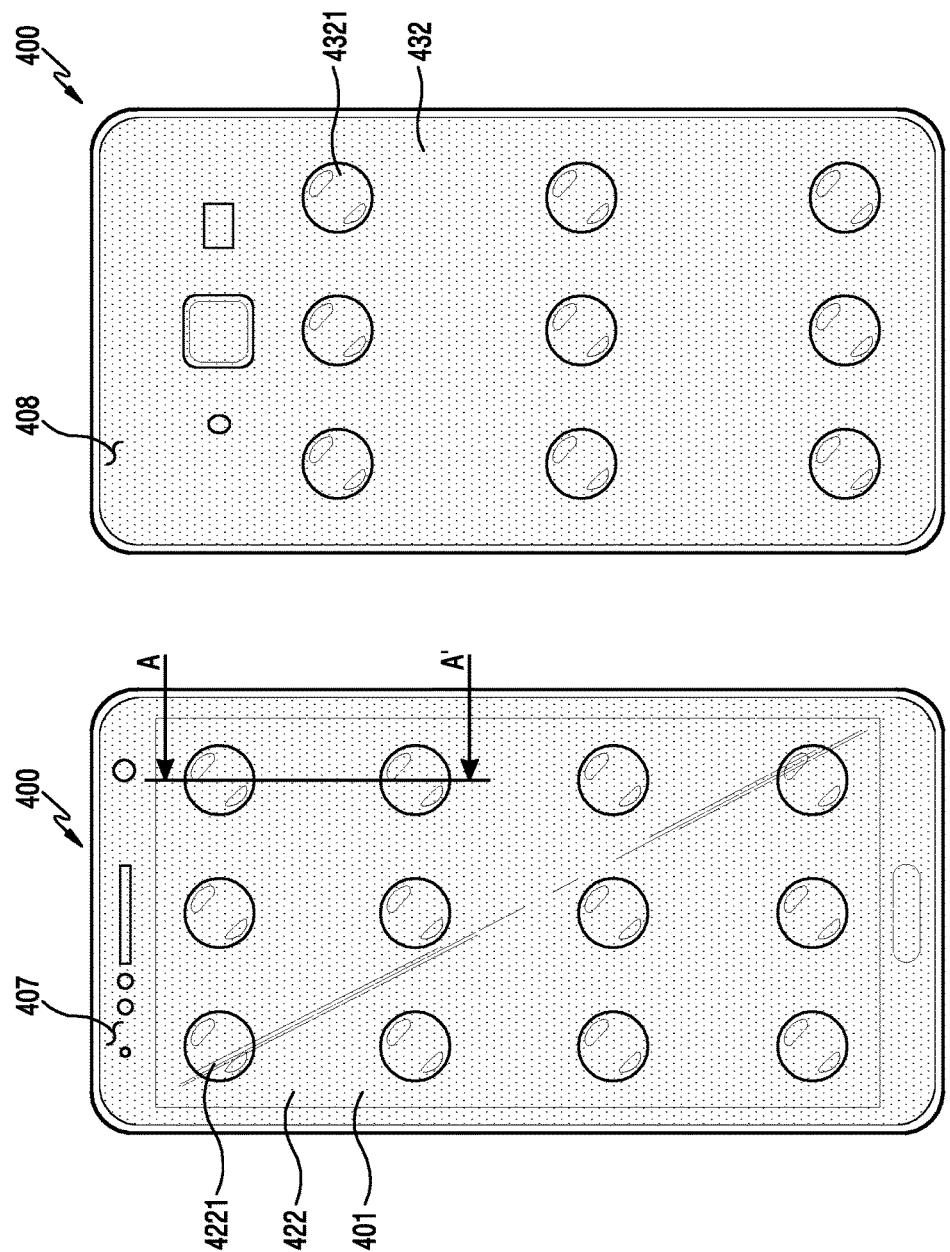
FIG. 4A is a front view (left side) and a rear view (right side) of an electronic device having a protective member applied thereto according to various embodiments of the present disclosure.

FIG. 4A is a front view (left) and a rear view (right) of an electronic device 400 that has protective members 422 and 432 applied thereto on the front and rear surfaces of the electronic device, respectively, according to various embodiments of the present disclosure. The electronic device 400 of FIG. 4A may be an embodiment of an electronic device that is similar to, or different from, the electronic device 300 of FIG. 3.

Referring to FIG. 4A, the electronic device 400 may include the protective members 422 and 432 that are disposed on at least one of or both of the front surface 407 and back or rear surface 408 thereof, respectively. According to an embodiment, the protective members 422 and 432 having a film shape may be disposed in such a way of being attached to the front 407, which includes a display 401, and the back 408 of the electronic device 400.

According to various embodiments, the protective members 422 and 432, when detecting the drop of the electronic device 400 under the control of the electronic device 400, may be controlled such that raised portions 4221 and 4321 are formed. That is, portions 4221 and 4321 become raised in response to the drop being detected. According to an embodiment, the raised portions 4221 and 4321 may be arranged on the front 407 and back 408 of the electronic device 400 with a specified interval therebetween, but the raised portions 4221 and 4321 are not limited thereto. For example, the raised portions 4221 and 4321 may be formed at irregular intervals, and may be formed to have different heights according to the positions thereof. According to an embodiment, although the raised portions 4221 and 4321 are illustrated as having a circular shape, the raised portions 4221 and 4321 are not limited to any particular shape and may be formed in various shapes.

Figure 4B:
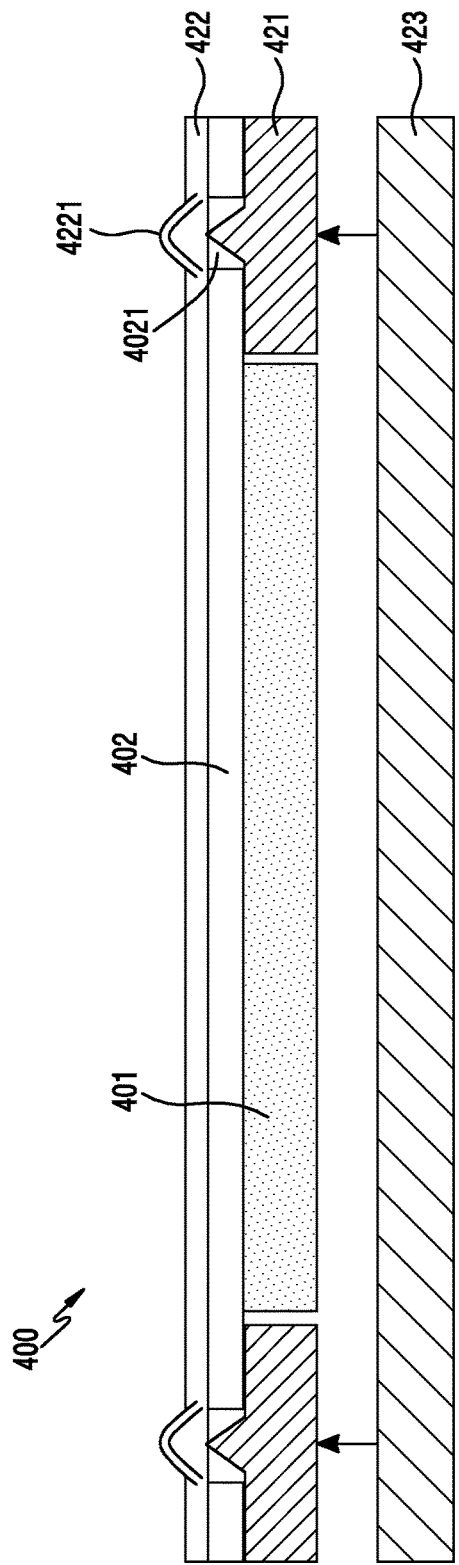
FIG. 4B is a sectional view of major parts of the electronic device having the protective member applied thereto, according to various embodiments of the present disclosure, where the sectional view is taken along line A-A' of FIG. 4A.

FIG. 4B is a sectional view of major parts of the electronic device 400 having the protective member 422 applied thereto, according to various embodiments of the present disclosure, where the sectional view is taken along line A-A' of FIG. 4A.

Referring to FIG. 4B, the protective member 422 may be stacked on window glass 402 in which the display 401 is included. According to an embodiment, the display 401 may be a touch screen device that includes a touch sensor. According to an embodiment, the protective member 422 may be a transparent polymer film. According to an embodiment, the electronic device 400 may have a protective member driving module disposed therein for detecting the drop of the electronic device 400 and activating the protective member. According to an embodiment, the protective member driving module may include a tactile layer 421 that is disposed on the bottom of the window glass 402 and a tactile layer controller 423 that is located below the tactile layer 421 to control the tactile layer 421. According to an embodiment, the fluid (e.g., gas, liquid, etc.) in the tactile layer 421 may push the protective member 422 upward through an opening 4021 of the window glass 402 under the control of the tactile layer controller 423 such that the raised portion 4221 that protrudes upward may be formed on the protective member 422.

Figure 4C:
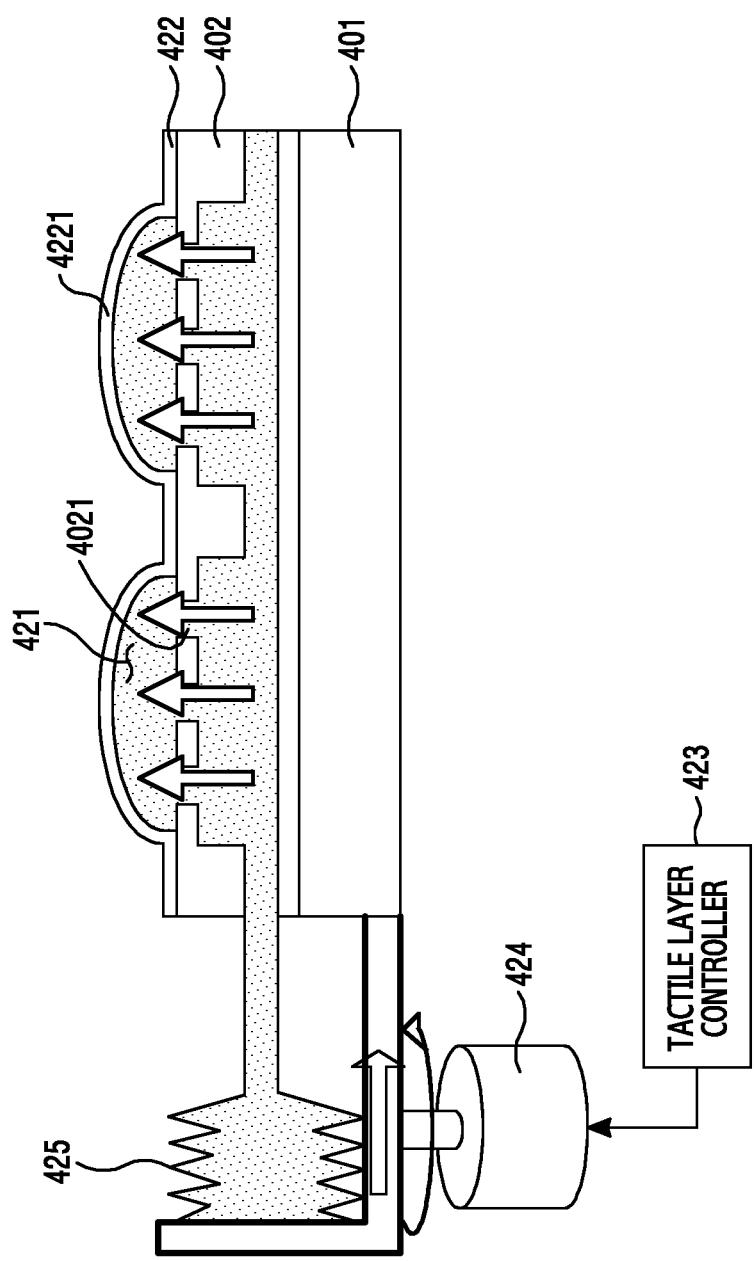
FIG. 4C is a view illustrating the operating principle of the protective member according to various embodiments of the present disclosure.

FIG. 4C is a view illustrating the operating principle of the protective member 422 according to various embodiments of the present disclosure.

Referring to FIG. 4C, the tactile layer 421 may include the protective member 422 (e.g., a transparent polymer film, an elastomer film, etc.) stacked on the top of the window glass 402, fluid located below the window glass 402 and introduced into at least one opening 4021 formed in the window glass 402, and a micro-motor 424 that includes a bellows 425 that presses the fluid toward the protective member.

According to various embodiments, when the drop of the electronic device 400 is detected, the tactile layer controller 423 may control the tactile layer 421. According to an embodiment, the tactile layer controller 423 may control the micro-motor 424 of the tactile layer 421 to drive the bellows 425 and to press the fluid deposited below the window glass 402 toward the protective member 422 through the opening 4021 by the motion of the driven bellows 425. According to an embodiment, the pressed fluid may push the protective member 422 upward in a specified position to form the raised portion 4221.

According to various embodiments, the tactile layer 421 may be controlled by the tactile layer controller 423, but is not limited thereto. For example, the tactile layer 421 may activate the protective member 422 under the control of the processor of the electronic device 400 other than the tactile layer controller 423.

Figure 5A:
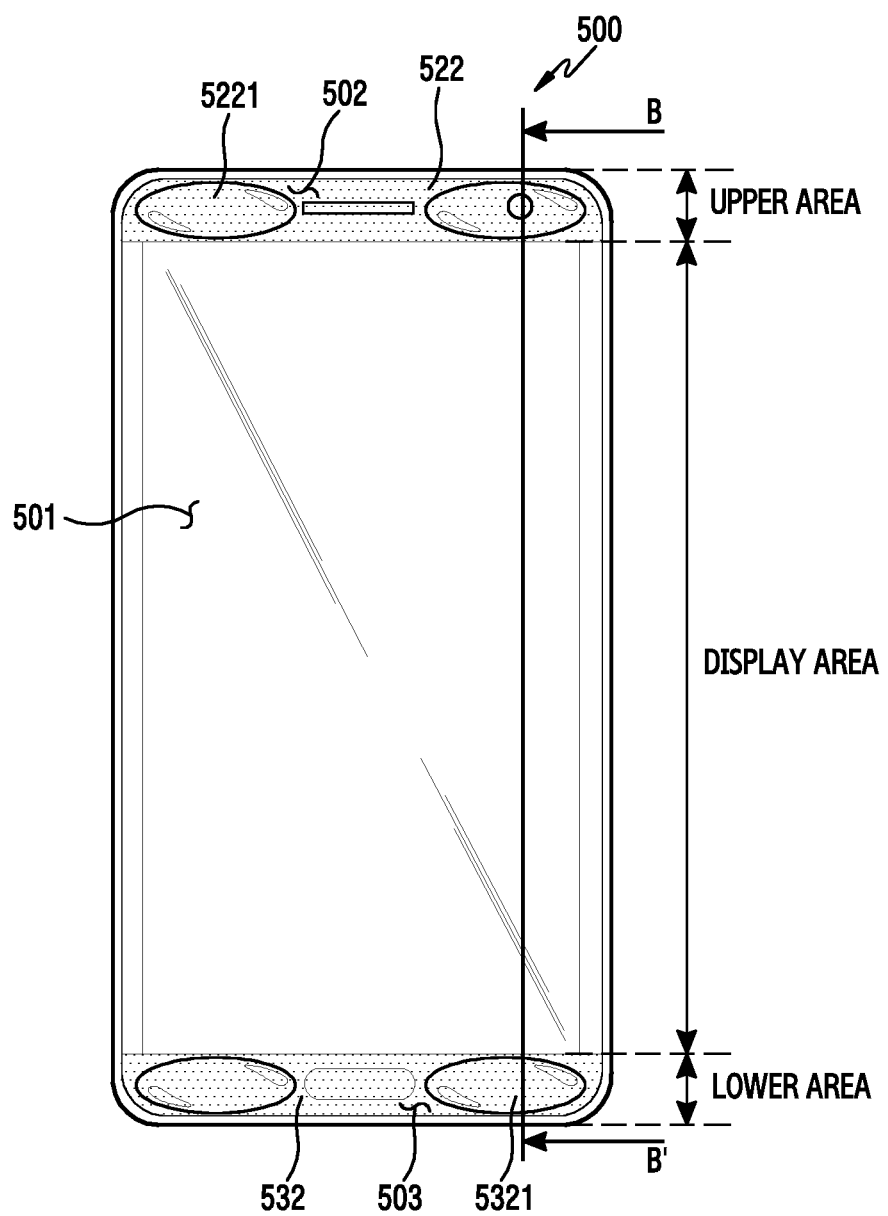
FIG. 5A is a view illustrating an electronic device having a protective member applied thereto according to various embodiments of the present disclosure.
Figure 5B:
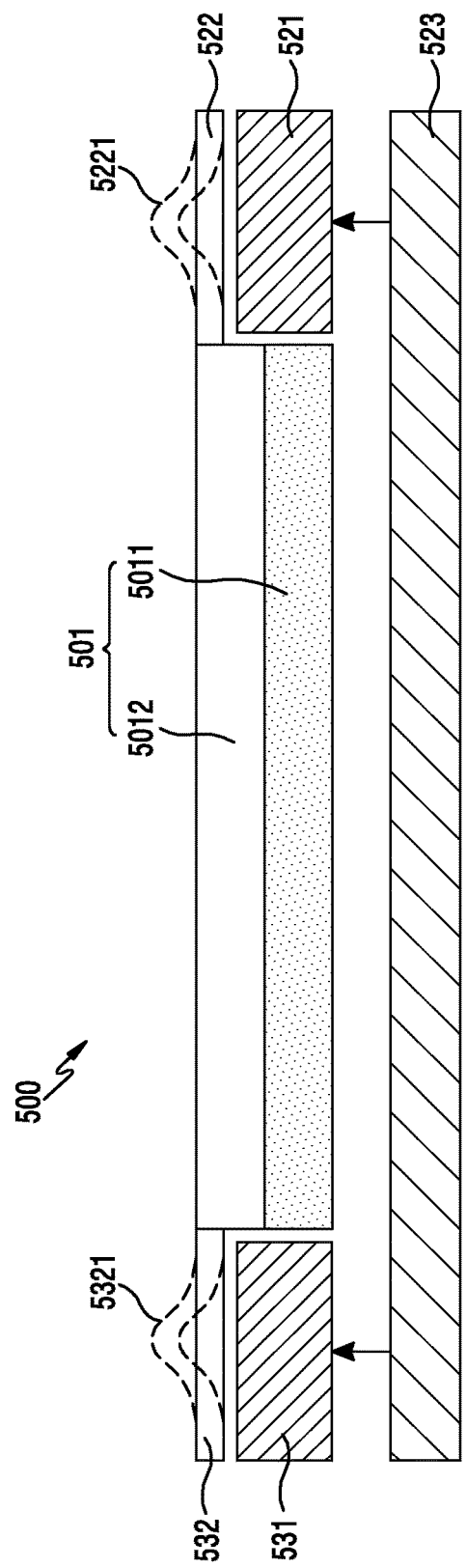
FIG. 5B is a sectional view of major parts of the electronic device having the protective member applied thereto, according to various embodiments of the present disclosure, where the sectional view is taken along line B-B' of FIG. 5A.

FIG. 5A is a view illustrating an electronic device having protective members applied thereto according to various embodiments of the present disclosure. FIG. 5B is a sectional view of major parts of the electronic device having the protective members applied thereto, according to various embodiments of the present disclosure, where the sectional view is taken along line B-B' of FIG. 5A. The electronic device 500 of FIGS. 5A and 5B may be an embodiment of an electronic device that is similar to, or different from, the electronic device 300 of FIG. 3.

Referring to FIG. 5A, the protective members may be formed of a material that has sufficient resilience to form a raised portion in the upward direction by receiving fluid pressed by a tactile layer. When the protective members are applied to a touch-based display of the electronic device through this configuration, a sense of touch may be deteriorated.

In the embodiment of the present disclosure, the electronic device 500 may include the protective members 522 and 532 that are applied only to the upper and lower areas 502 and 503, which are located on the upper and lower sides of the display area 501, except the display area 501.

Referring to FIG. 5B, the protective members 522 and 532 may be applied only to the upper and lower areas 502 and 503, that is, in areas other than the display area 501. According to an embodiment, the protective members 522 and 532 and window glass 5012 of the display 5011 may be seamlessly coupled to each other. According to an embodiment, the electronic device 500 may have a protective member driving module disposed therein for detecting the drop of the electronic device 500 and, if the drop is detected, for activating the protective members 522 and 532. According to an embodiment, the protective member driving module may include a tactile layer 521 disposed on the bottom of the protective members 522 and 532 and a tactile layer controller 523 located below the tactile layer 521 to control the tactile layer 521. According to an embodiment, the tactile layer 521 of the protective member driving module may be disposed in the area of the electronic device where the window glass 5012 is not disposed. According to an embodiment, the fluid (e.g., gas, liquid, etc.) in the tactile layer 521 may push the protective members 522 and 532 upward according to the control of the tactile layer controller 523 such that raised portions 5221 and 5321 that protrude upward may be formed on the protective members 522 and 523. Since the configuration of a micro-motor and a bellows for driving the fluid of the tactile layer is similar to the configuration illustrated in FIG. 4C, a description thereof will be hereinafter omitted.

Figure 6A:
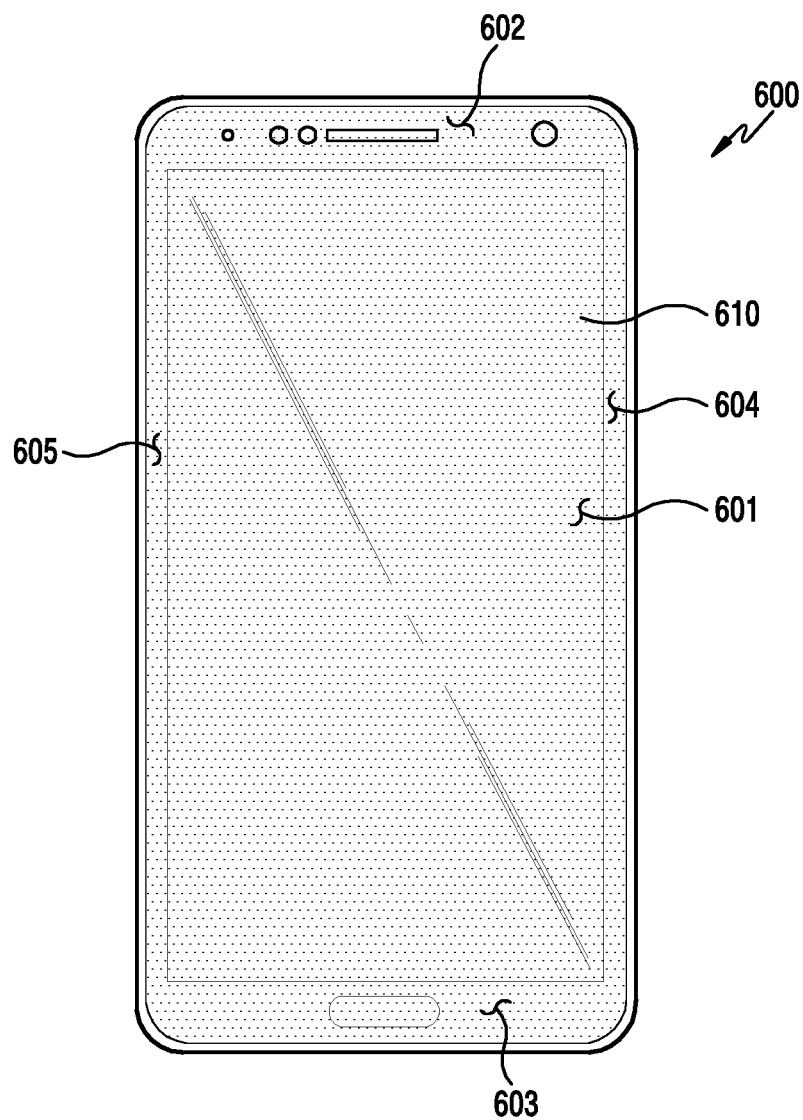
FIG. 6A, FIG. 6B and FIG. 6C are views illustrating an electronic device having a protective member applied thereto according to various embodiments of the present disclosure.
Figure 6B:
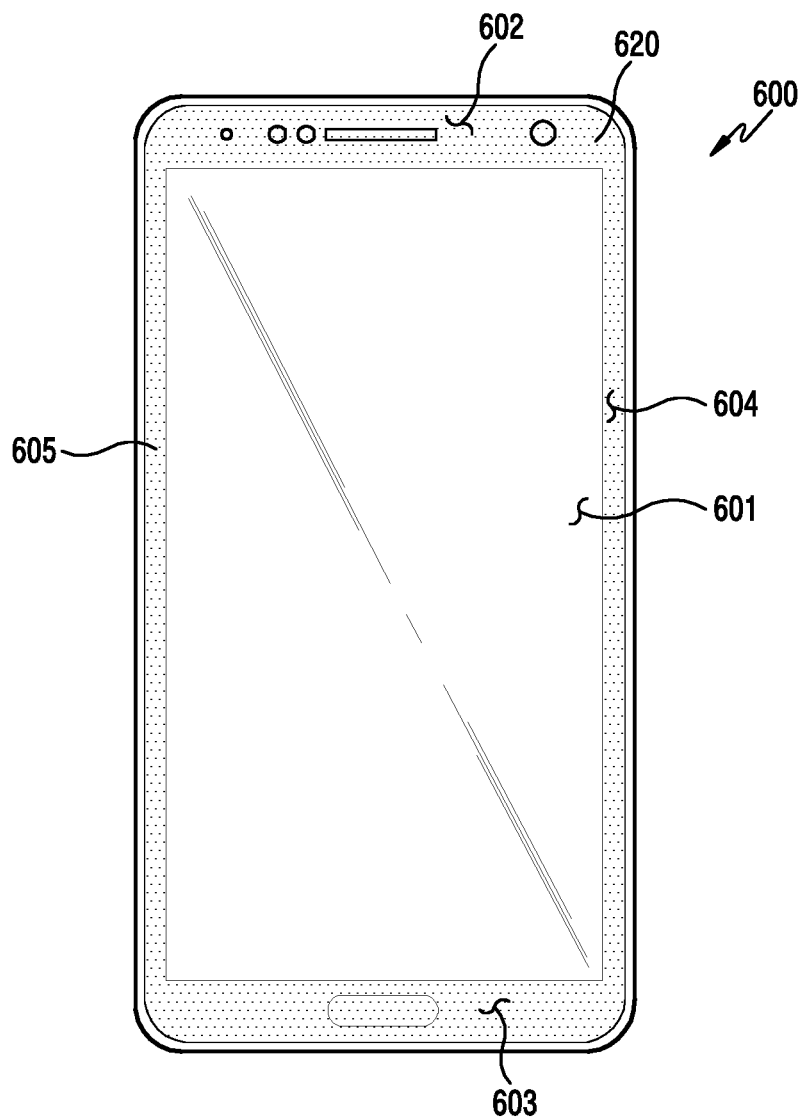
Figure 6C:
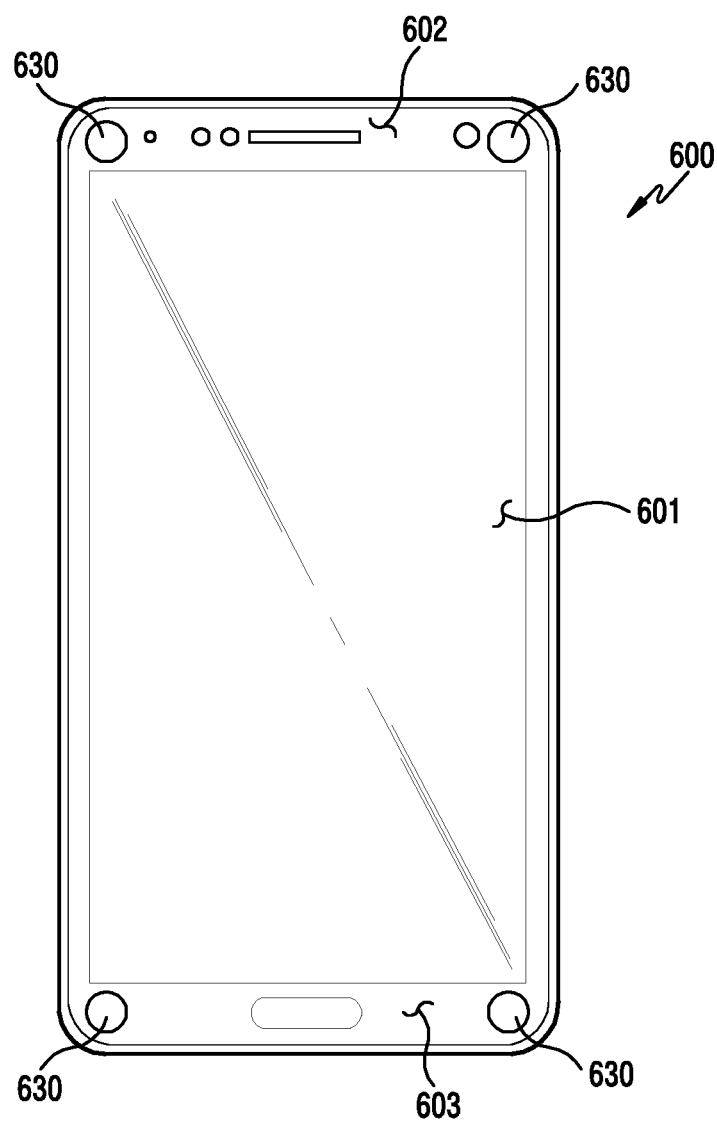

FIGS. 6A to 6C are views illustrating an electronic device having a protective member 610 (FIG. 6A), 620 (FIG. 6B), 630 (FIG. 6C) applied thereto according to various embodiments of the present disclosure. The electronic device 600 of FIGS. 6A and 6B may be an embodiment of an electronic device that is similar to, or different from, the electronic device 300 of FIG. 3.

Referring to FIGS. 6A and 6B, the protective member 610, 620 may include a high-hardness film that is disposed in such a way of being attached to at least a part of the front of the electronic device 600. According to an embodiment, the high-hardness film may be attached to window glass of the electronic device 600 to protect the window from local damage that is applied to the window by an external impact and the drop of the electronic device. According to an embodiment, the protective member 610, 620 may be a paint layer that may include self-healing paint. According to an embodiment, the self-healing paint layer may be formed of a soft material to absorb local damage that is applied to the window by an external impact and the drop of the electronic device, thereby protecting the window.

According to various embodiments, the above-described protective member 610, 620 (e.g., a high-hardness film or a self-healing paint layer) may be disposed in the display area 601 or in all the black matrix or the border areas (BM areas) 602, 603, 604, and 605 bordering the display area 601 that displays an image. According to an embodiment, the protective member 610, 620 may also be disposed only in the BM areas 602, 603, 604, and 605 other than the display area 601.

Referring to FIG. 6C, the protective member 630 may be disposed in such a way of being attached to at least a part of the BM areas 602, 603, 604, and 605 other than the display area 601. According to an embodiment, the protective member 630 may be formed in a bumper type. According to an embodiment, the protective member 630 may be formed of a resilient material such as rubber, silicone, urethane, etc., a material such as a film, or a material such as high-hardness sapphire, ceramic, glass, etc.

Figure 7:
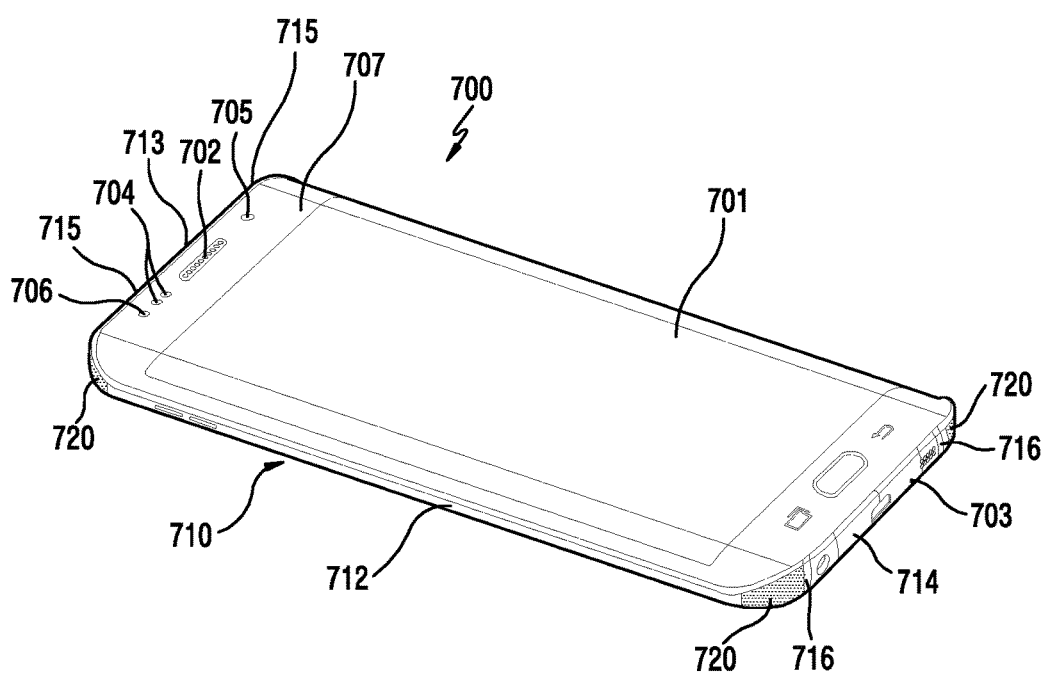
FIG. 7 is a perspective view of an electronic device having a protective member applied thereto according to various embodiments of the present disclosure.

FIG. 7 is a perspective view of an electronic device 700 having protective members applied thereto according to various embodiments of the present disclosure.

Referring to FIG. 7, a display 701 may be installed on the front 707 of the electronic device 700. A speaker device 702 for receiving a counterpart's speech may be installed on the upper side of the display 701. A microphone device 703 for transmitting an electronic device user's speech to a counterpart may be installed on the lower side of the display 701.

According to an embodiment, components for performing various functions of the electronic device 700 may be arranged around the speaker device 702. The components may include at least one sensor module 704. The sensor module 704 may include, for example, at least one of an illuminance sensor (e.g., an optical sensor), a proximity sensor, an infrared sensor, and an ultrasonic sensor. According to an embodiment, the components may also include a camera device 705. According to an embodiment, the components may also include an indicator light 706 (e.g., an LED indicator) for informing a user of state information of the electronic device 700.

According to various embodiments, the electronic device 700 may include a metal member 710. For example, the metal member 710 may be disposed, as a part, in at least one area of a metal housing or within the metal housing. According to an embodiment, the metal member 710 may be disposed along an outer periphery of the electronic device 700, and may also extend to at least one area of the back of the electronic device 700, which is connected to the outer periphery of the electronic device. According to an embodiment, the metal member 710 may define the thickness of the electronic device along an outer periphery of the electronic device 700, and may be formed in a loop shape. Without being limited thereto, however, the metal member 710 may also be formed in such a way that the metal member contributes to at least a part of the thickness of the electronic device 700. According to an embodiment, the metal member 710 may also be disposed only in at least one area of the outer periphery of the electronic device 700. According to an embodiment, the metal member 710 may include one or more segmenting portions 715 and 716. According to an embodiment, unit conductive members separated by the segmenting portions 715 and 716 may be used, for example, as an antenna radiator that operates in at least one frequency band. Without being limited thereto, however, the outer periphery of the electronic device 700 may also be formed of a synthetic resin material.

According to various embodiments, the electronic device 700 may have the protective members 720 disposed on the respective corners thereof. According to an embodiment, the protective members 720 may include an electro-active polymer (EAP) or an electro-mechanical polymer (EMP).

According to an embodiment, the EAP, which is an electroactive polymer based actuator, may generate electro-pressure by virtue of an electrostatic force to change its shape when a voltage is applied thereto. According to an embodiment, the protective members 720 may include a shape memory alloy, the shape of which is changed according to a temperature change, or a carbon nanotube, the shape of which is changed according to whether a voltage is applied thereto.

According to various embodiments, the electronic device 700 may detect the dropping state thereof and may control a protective member driving module (e.g., a switching module), which is electrically connected with the protective members 720, according to the detected dropping state to activate the protective members 720, thereby controlling the protective members 720 such that at least a part of the protective member 720 is deformed to protrude outward from the electronic device 700. According to an embodiment, the outwardly protruding portions of the protective members 720 may serve as a buffer member when the electronic device 700 is dropped on the ground.

Figure 8A:
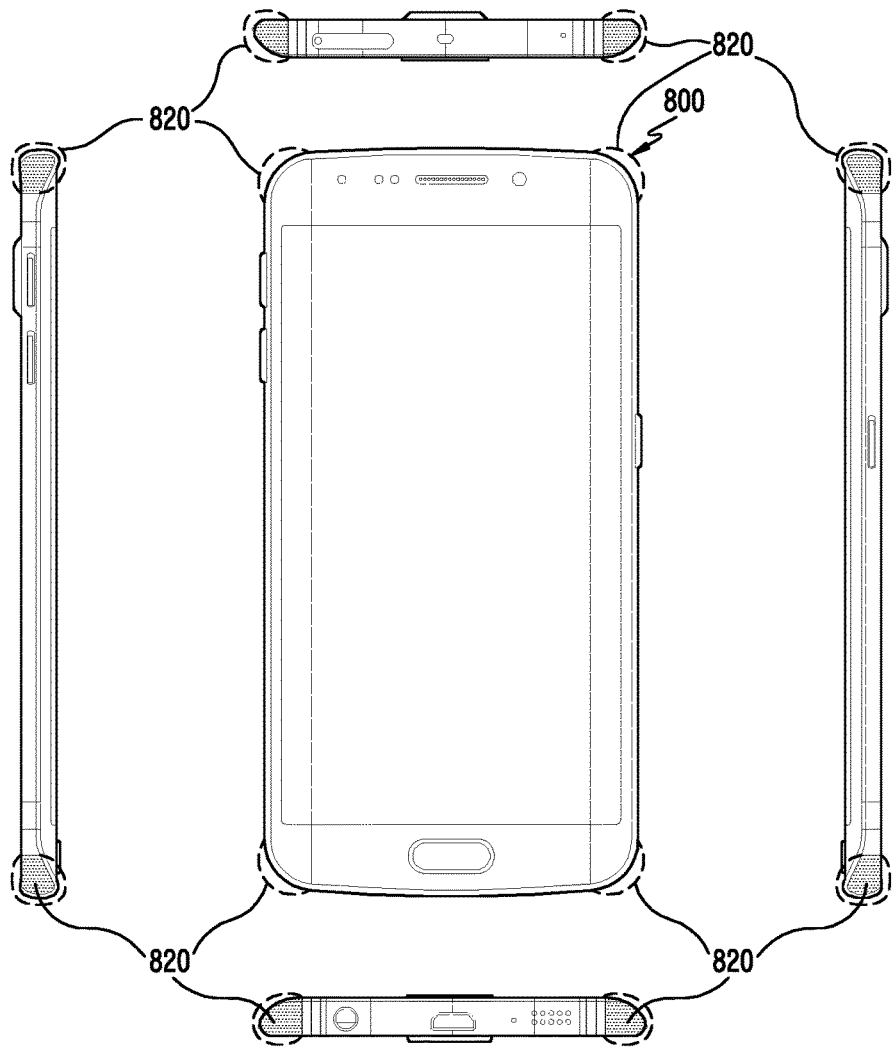
FIG. 8A is a view of an electronic device having a protective member applied thereto, according to various embodiments of the present disclosure, as viewed in various directions.
Figure 8B:
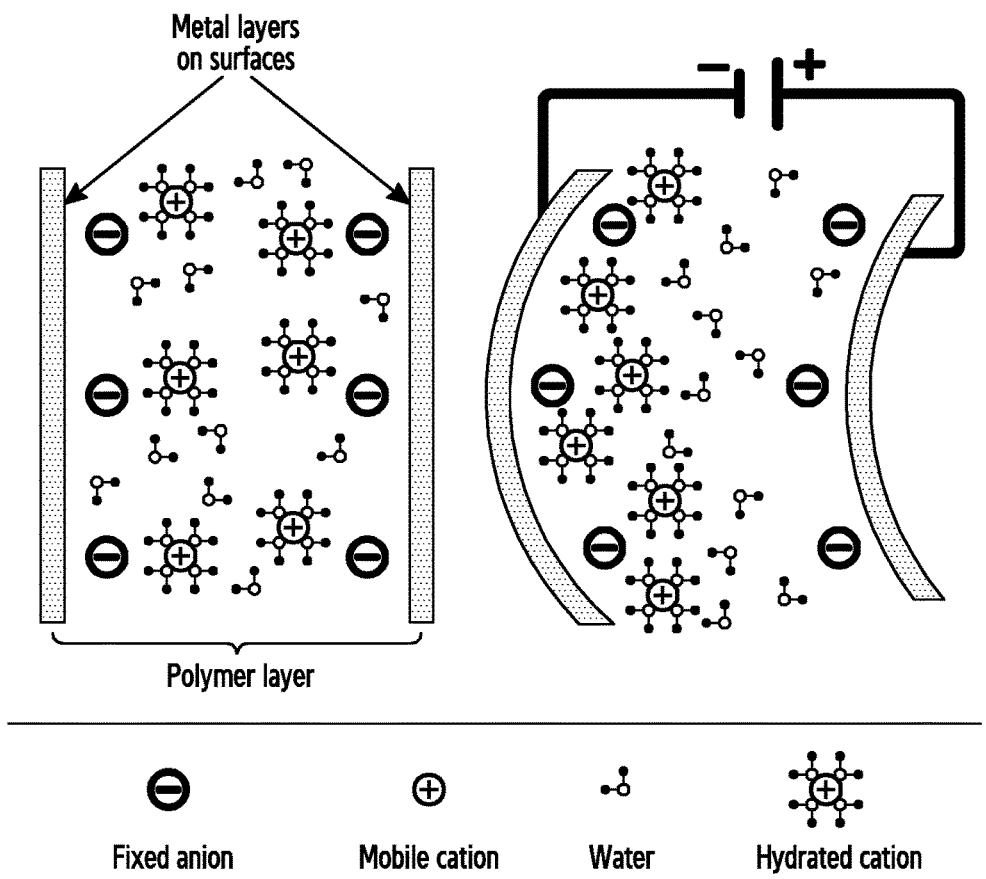
FIG. 8B is a view illustrating the operating principle of the protective member according to various embodiments of the present disclosure.

FIG. 8A are views of an electronic device having protective members 820 applied thereto, according to various embodiments of the present disclosure, as viewed in various directions. FIG. 8B is a view illustrating the operating principle of the protective members according to various embodiments of the present disclosure.

The electronic device 800 of FIG. 8A may be an embodiment of an electronic device that is similar to, or different from, the electronic device 700 of FIG. 7, and the protective member 820 of FIG. 8A may be an embodiment of a protective member that is similar to, or different from, the protective member 720 of FIG. 7.

Referring to FIGS. 8A and 8B, the electronic device 800 may have the protective members 820 applied to the respective corners thereof. According to an embodiment, the protective members 820 may include an EAP, which has a shape that is changed by a phenomenon in which ions move in order to balance electric charges caused by an electrode voltage difference and contraction and expansion occur accordingly.

According to various embodiments, the electronic device 800 may detect the drop thereof using at least one sensor (e.g., an acceleration sensor, a gyro sensor, etc.). According to an embodiment, the electronic device 800 may drive a protective member driving module (e.g., a switching module) when the drop of the electronic device is detected by the sensor. According to an embodiment, the protective member driving module may vary the voltage applied to the protective members 820 (e.g., an EAP), and the protective members 820 may be activated by the changed voltage to change the shape thereof. According to an embodiment, the protective members 820 disposed on the respective corners of the electronic device 800 may be deformed by the voltage variation such that they protrude outward from the electronic device by a specified distance. According to an embodiment, the deformed protective members 820 may serve as a buffer member for the electronic device 800.

Figure 9:
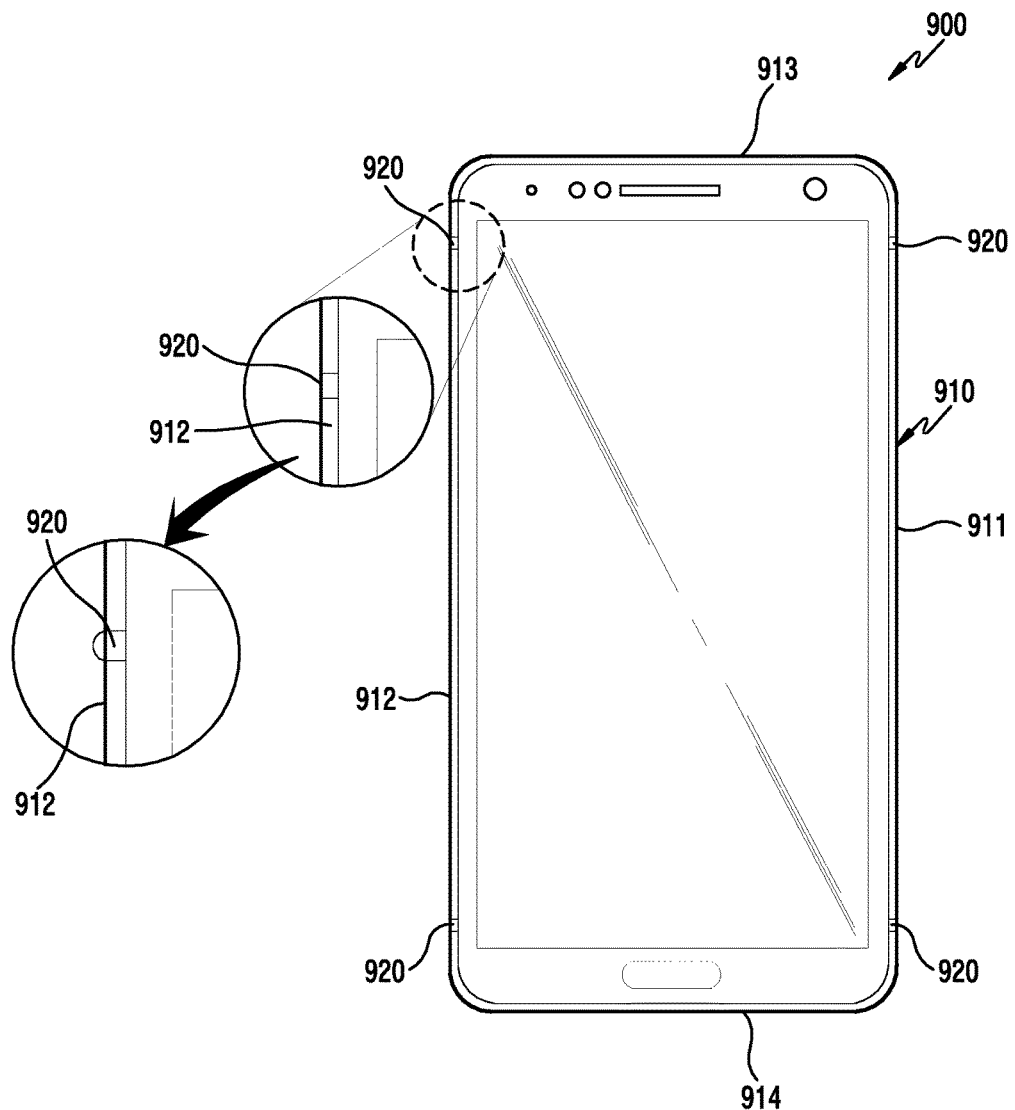
FIG. 9 is a view illustrating an electronic device having a protective member applied thereto according to various embodiments of the present disclosure.

FIG. 9 is a view of an electronic device 900 having protective members 920 applied thereto according to various embodiments of the present disclosure.

The electronic device 900 of FIG. 9 may be an embodiment of an electronic device that is similar to, or different from, the electronic device 700 of FIG. 7, and the protective members 920 of FIG. 9 may be an embodiment of a protective member that is similar to, or different from, the protective member 720 of FIG. 7.

Referring to FIG. 9, the electronic device 900 may have a bezel part 910 formed along the outer periphery thereof. According to an embodiment, the bezel part 910 may include a right bezel portion 911, a left bezel portion 912, an upper bezel portion 913, and a lower bezel portion 914 when viewed from the front. According to an embodiment, at least one of the bezel portions may include the protective members 920 (e.g., an EAP), and the protective members 920 may serve as a segmenting portion for segmenting the bezel part 910 into unit bezel portions. According to an embodiment, the unit bezel portions segmented by the protective members 920 may be used to perform various functions (e.g., an antenna radiator, an extended ground member, etc.). According to an embodiment, a pair of protective members 920 is formed with a specified interval therebetween in the right bezel portion 911 and in the left bezel portion 912, but the protective members 920 are not limited thereto. For example, the protective members 920 may be disposed in at least one of the upper and lower bezel portions 913 and 914.

According to various embodiments, the electronic device 900 may detect that the electronic device has been dropped by using at least one sensor (e.g., an acceleration sensor, a gyro sensor, etc.) to detect the drop. According to an embodiment, the electronic device 900 may drive a protective member driving module (e.g., a switching module) when the drop of the electronic device is detected by the sensor. According to an embodiment, the protective member driving module may vary the voltage applied to the protective members 920, and the protective members 920 may be activated by the changed voltage to change the shape thereof. According to an embodiment, the protective members 920, which may be disposed as a segmenting portion in the bezel part 910 of the electronic device 900, may be deformed by the voltage variation in such a way of protruding outward from the electronic device by a specified distance. According to an embodiment, the deformed protective members 920 may serve as a buffer member for the electronic device 900.

Figure 10:
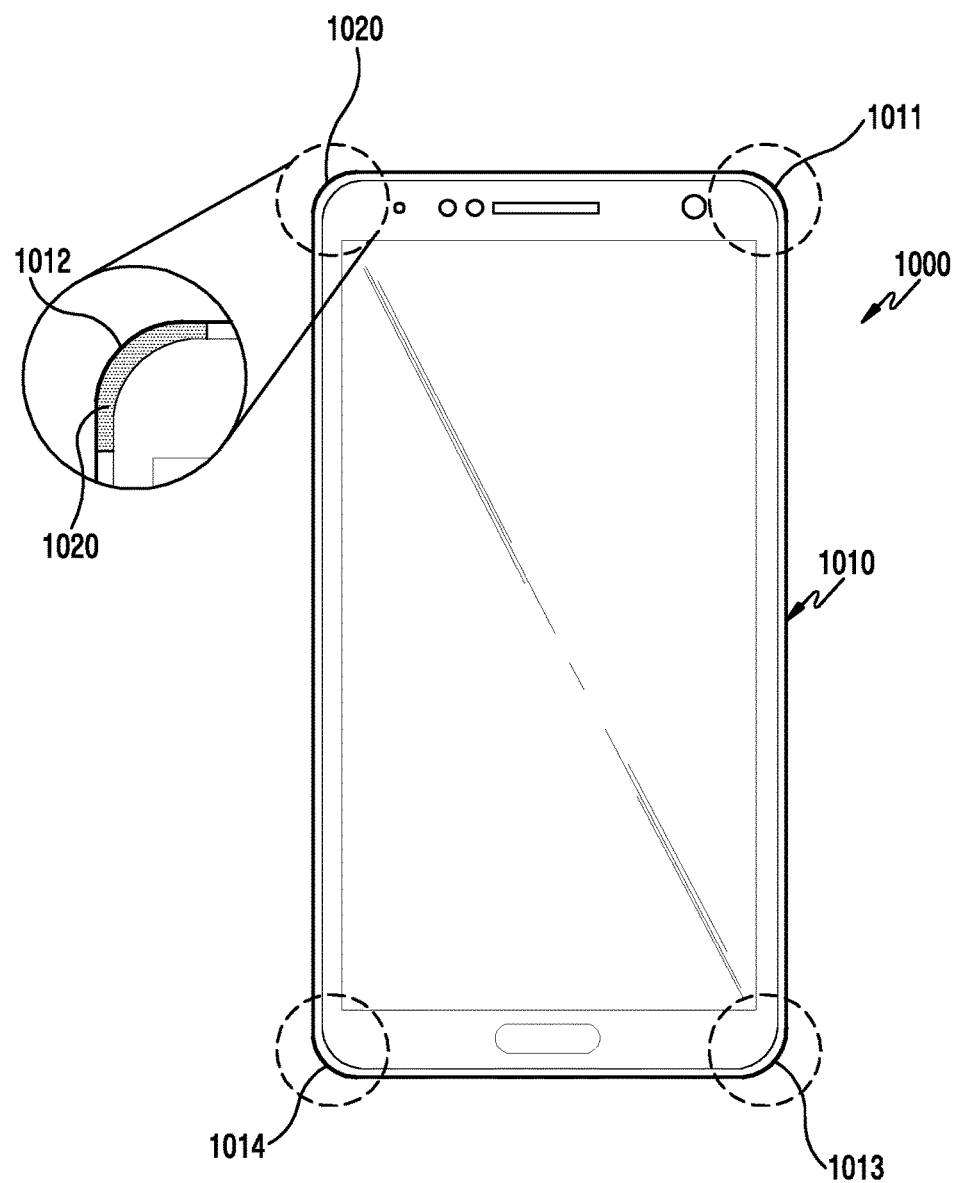
FIG. 10 is a view illustrating an electronic device having a protective member applied thereto according to various embodiments of the present disclosure.

FIG. 10 is a view illustrating an electronic device having a protective member applied thereto according to various embodiments of the present disclosure.

The electronic device 1000 of FIG. 10 may be an embodiment of an electronic device that is similar to, or different from, the electronic device 700 of FIG. 7, and the protective member 1020 of FIG. 10 may be an embodiment of a protective member that is similar to, or different from, the protective member 720 of FIG. 7.

Referring to FIG. 10, the electronic device 1000 may have a bezel part 1010 formed along the outer periphery thereof. According to an embodiment, the bezel part 1010 may include an upper right corner 1011, an upper left corner 1012, a lower right corner 1013, and a lower left corner 1014 when viewed from the front. According to an embodiment, the protective member 1020 (e.g., an EAP) may be included in at least one corner of the bezel part. According to an embodiment, the protective member may also include a general resilient member (e.g., rubber, silicone, urethane, etc.) that conforms to the shape of the electronic device and does not change shape.

According to various embodiments, the electronic device 1000 may detect the drop thereof using at least one sensor (e.g., an acceleration sensor, a gyro sensor, etc.). According to an embodiment, the electronic device 1000 may drive a protective member driving module (e.g., a switching module) when the drop of the electronic device is detected by the sensor. According to an embodiment, the protective member driving module may vary the voltage applied to the protective members 1020 (e.g., an EAP), and the protective member 1020 may be activated by the changed voltage to change the shape thereof. According to an embodiment, the protective member 1020, which serves as a corner of the bezel part 1010 of the electronic device 1000, may be deformed by the voltage variation in such a way of protruding outward from the electronic device by a specified distance. According to an embodiment, the deformed protective member 1020 may serve as a buffer member for the electronic device 1000.

Figure 11A:
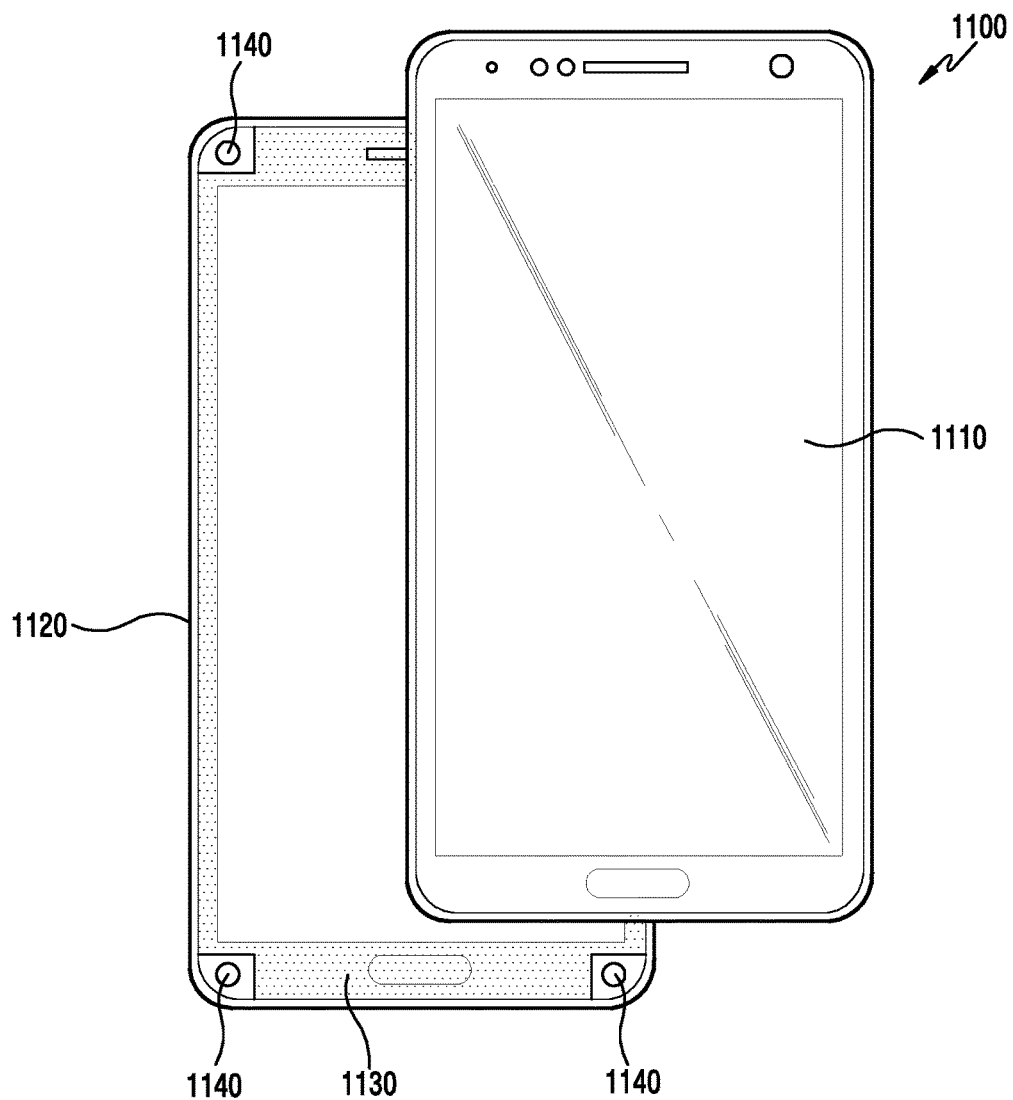
FIG. 11A is a view illustrating an disassembled state of an electronic device having a protective member applied thereto according to various embodiments of the present disclosure.
Figure 11B:
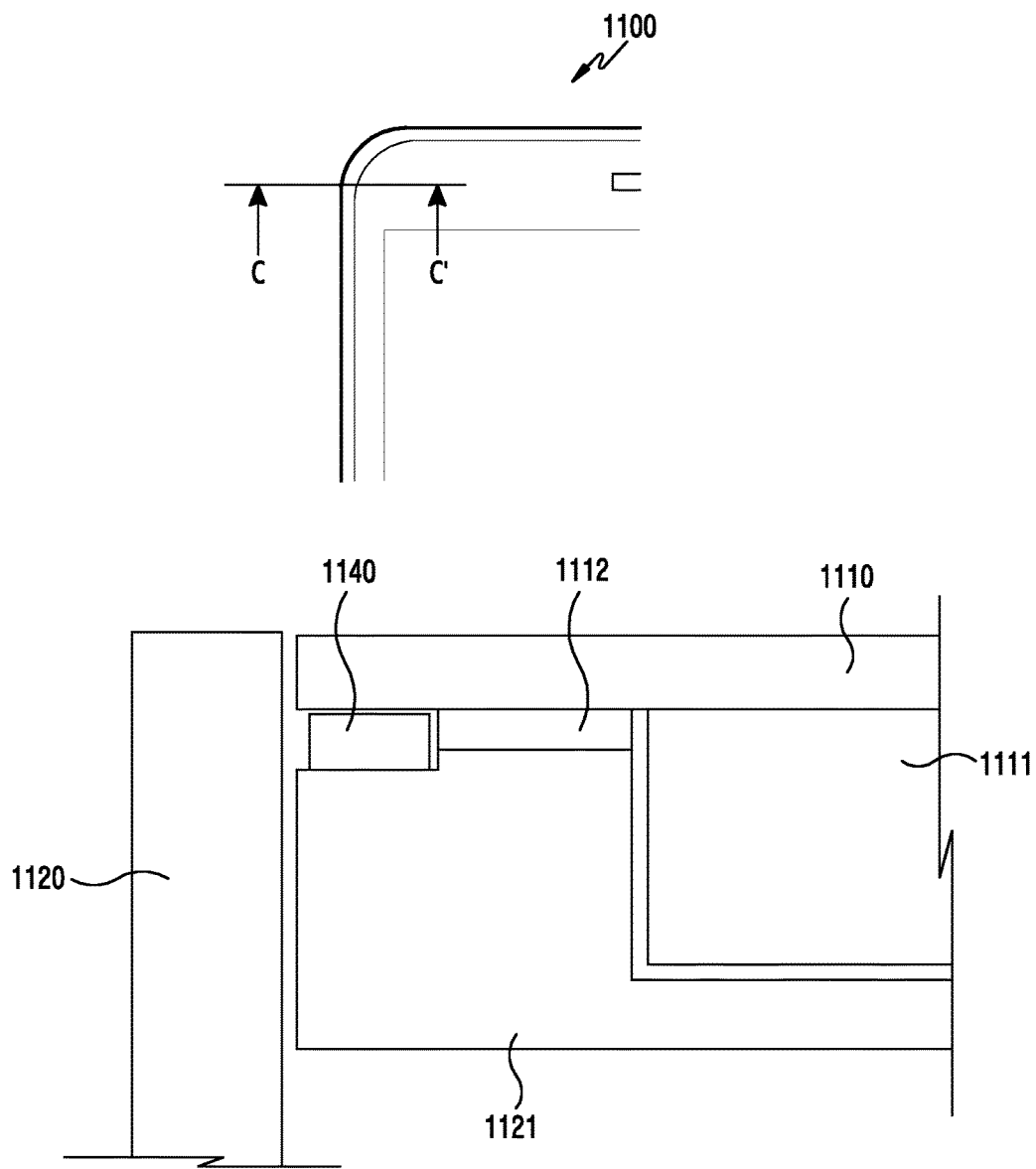
FIG. 11B and FIG. 11C are sectional views of major parts of the electronic device having the protective member applied thereto, according to various embodiments of the present disclosure, where the sectional views are taken along line C-C' of FIG. 11B.
Figure 11C:
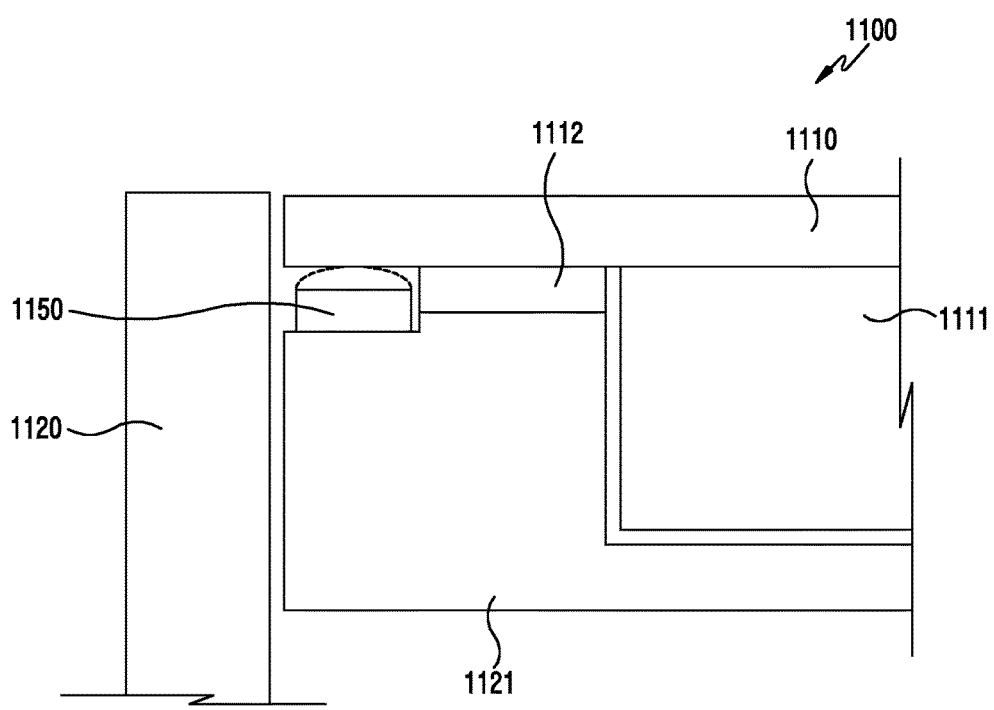

FIG. 11A is a view illustrating a disassembled state of an electronic device 1100 having protective members 1140 applied thereto according to various embodiments of the present disclosure. FIGS. 11B and 11C are sectional views of major parts of the electronic device 1100 having protective members 1150 applied thereto, according to various embodiments of the present disclosure, where the sectional views are taken along line C-C' of FIG. 11B.

The electronic device 1100 of FIG. 11A may be an embodiment of an electronic device that is similar to, or different from, the electronic device 700 of FIG. 7, and the protective members 1140 of FIG. 11C may be an embodiment of a protective member that is similar to, or different from, the protective member 720 of FIG. 7.

Referring to FIGS. 11A and 11B, the electronic device 1100 may include an outer housing 1120 and window glass 1110 coupled to the outer housing 1120, and a display 1111 may be stacked on the bottom of the window glass 1110. According to an embodiment, the window glass 1110 may be secured in such a way of being attached to the outer periphery of the upper portion of a bracket 1121, which is disposed in the outer housing 1120, by a double-sided tape 1112.

According to various embodiments, the double-sided tape 1112 may be removed from a partial area in each corner of the outer periphery of the bracket 1121, and the protective member 1140 may be disposed in the areas where the tape 1112 is removed. According to an embodiment, the protective members 1140 may be attached to the bracket 1121 and may have a height that is lower than, or equal to, that of the double-sided tape 1112. According to an embodiment, the protective members may be attached to the bracket 1121 and may be disposed so as to not make contact with the bottom of the window glass 1110. According to an embodiment, the protective members may include a resilient member (e.g., rubber, silicone, urethane, etc.).

According to various embodiments, when an external impact is applied to the electronic device 1100 (e.g., when the electronic device is dropped on the ground), the protective members 1140 with resilience may absorb the impact to prevent damage to the four corners of the window glass 1110.

Referring to FIG. 11C, the protective members 1150 may have the same configuration as the protective members illustrated in FIG. 11B, but may include a member (e.g., an EAP) that changes its shape when a voltage applied thereto is changed.

According to various embodiments, the electronic device 1100 may detect the drop thereof using at least one sensor (e.g., an acceleration sensor, a gyro sensor, etc.). According to an embodiment, the electronic device 1100 may drive a protective member driving module (e.g., a switching module) when the drop of the electronic device is detected by the sensor. According to an embodiment, the protective member driving module may vary the voltage applied to the protective members 1150 (e.g., an EAP), and the protective members 1150 may be activated by the changed voltage to change the shape thereof. According to an embodiment, the protective members 1150 disposed in the corners of the electronic device 1100 may be deformed by the voltage variation in such a way of protruding by a specified distance in the direction from the upper surface of the bracket 1121 to the window glass 1110. According to an embodiment, the deformed protective members 1150 may serve as a buffer member to protect the window glass 1110 of the electronic device 1100 from being damaged.

Figure 12A:
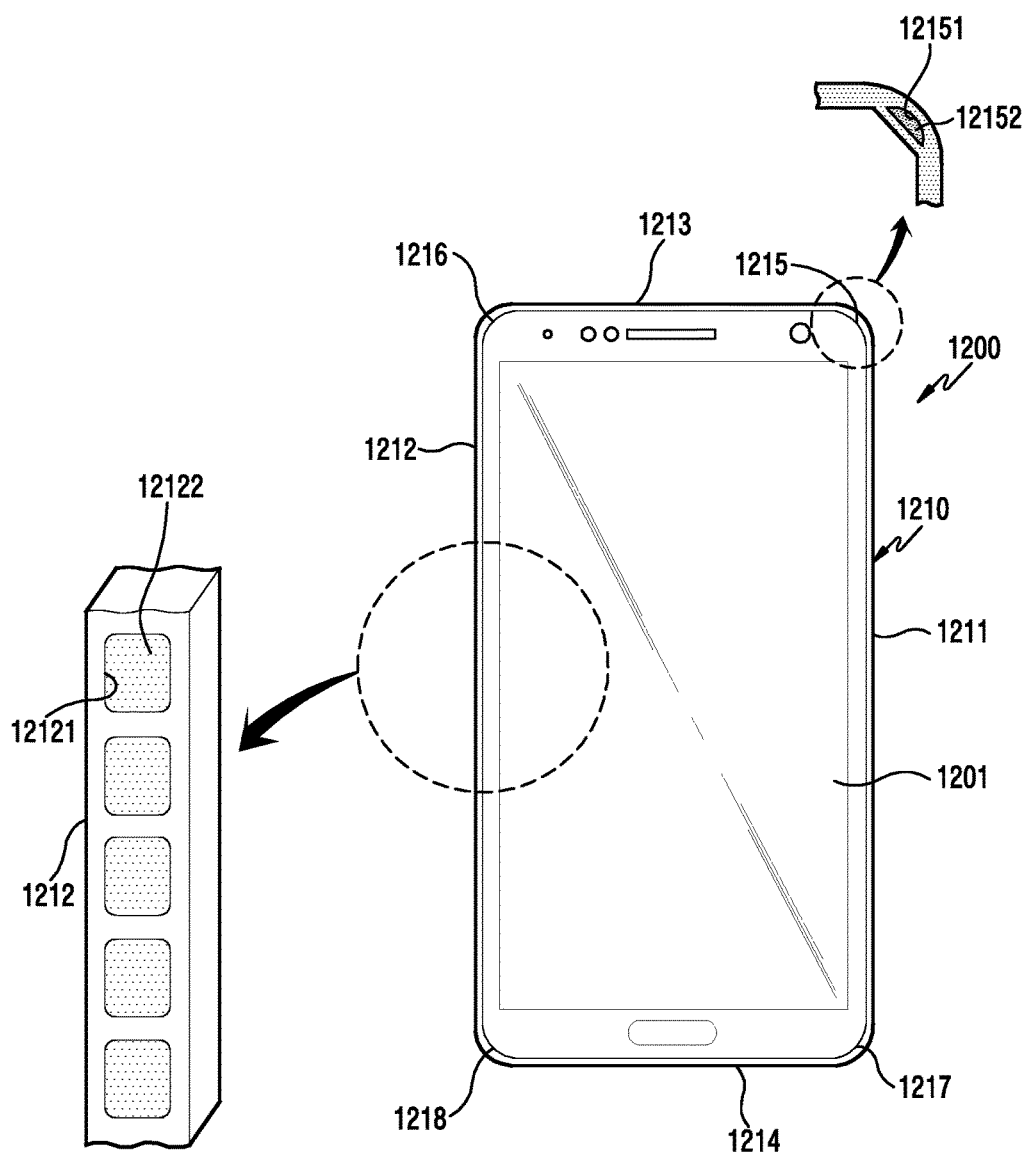
FIG. 12A is a view illustrating an electronic device having a protective member applied thereto according to various embodiments of the present disclosure.
Figure 12B:
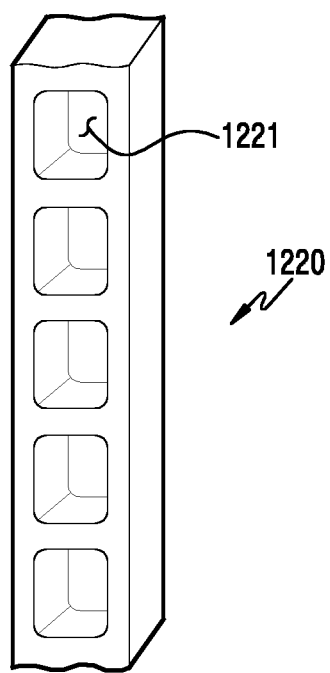
FIG. 12B and FIG. 12C are views illustrating the section of a part of the electronic device having the protective member applied thereto according to various embodiments of the present disclosure.
Figure 12C:
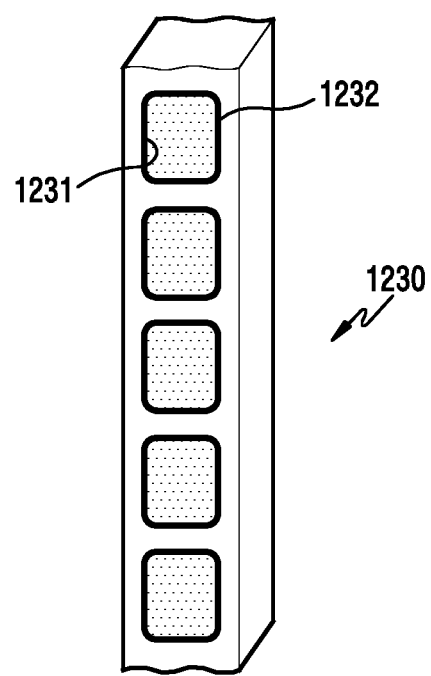

FIG. 12A is a view illustrating an electronic device having a protective member applied thereto according to various embodiments of the present disclosure. FIGS. 12B and 12C are views illustrating the section of a part of the electronic device having the protective member applied thereto according to various embodiments of the present disclosure.

The electronic device 1200 of FIG. 12A may be an embodiment of an electronic device that is similar to, or different from, the electronic device 700 of FIG. 7.

Referring to FIG. 12A, the electronic device 1200 may have a bezel part 1210 formed along the outer periphery thereof. According to an embodiment, the bezel part 1210 may include a right bezel portion 1211, a left bezel portion 1212, an upper bezel portion 1213, and a lower bezel portion 1214 when viewed from the front. According to an embodiment, the bezel part 1210 may include an upper right corner 1215, an upper left corner 1216, a lower right corner 1217, and a lower left corner 1218 when viewed from the front.

According to various embodiments, the bezel portions 1211, 1212, 1213, and 1214 may be formed of a metal member or a synthetic resin material. According to an embodiment, the left bezel portion 1212 may have a plurality of openings 12121 formed therein with a specified interval therebetween in the longitudinal cross-section thereof, and each opening 12121 may be filled with a protective member 12122. According to an embodiment, the left bezel portion 1212 may perform a buffering action for absorbing an external impact due to the nature of the protective member 12122. According to an embodiment, the openings 12121 formed in the left bezel portion 1212 and the protective members 12122 with which the openings 12121 are filled may also be applied to the other bezel portions 1211, 1213, and 1214 in the same way.

According to various embodiments, the upper right corner 1213 may also have an opening 12151 formed therein, and the corresponding opening 12151 may be filled with a protective member 12152. According to an embodiment, the upper right bezel portion 1215 may perform a buffering action for absorbing an external impact due to the nature (e.g., cushioning) of the protective member 12152. According to an embodiment, the opening 12151 formed in the upper right corner 1215 and the protective member 12152 with which the opening 12151 is filled may also be applied to the other corners 1216, 1217, and 1218 in the same way.

FIG. 12B illustrates a buffering structure that absorbs impact using only its opening structure without a protective member that fills the opening 1221 formed in a bezel part 1210, and FIG. 12C illustrates a structure in which an EAP is applied as a protective member 1232 along the inner surface of an opening 1231 formed in a bezel part 1230. According to an embodiment, when a changed voltage is applied to the protective member 1232, a force that expands outward from the opening 1231 is applied to the protective member 1232 so that the bezel part 1230 may perform a buffering action for absorbing an external impact.

Figure 13:
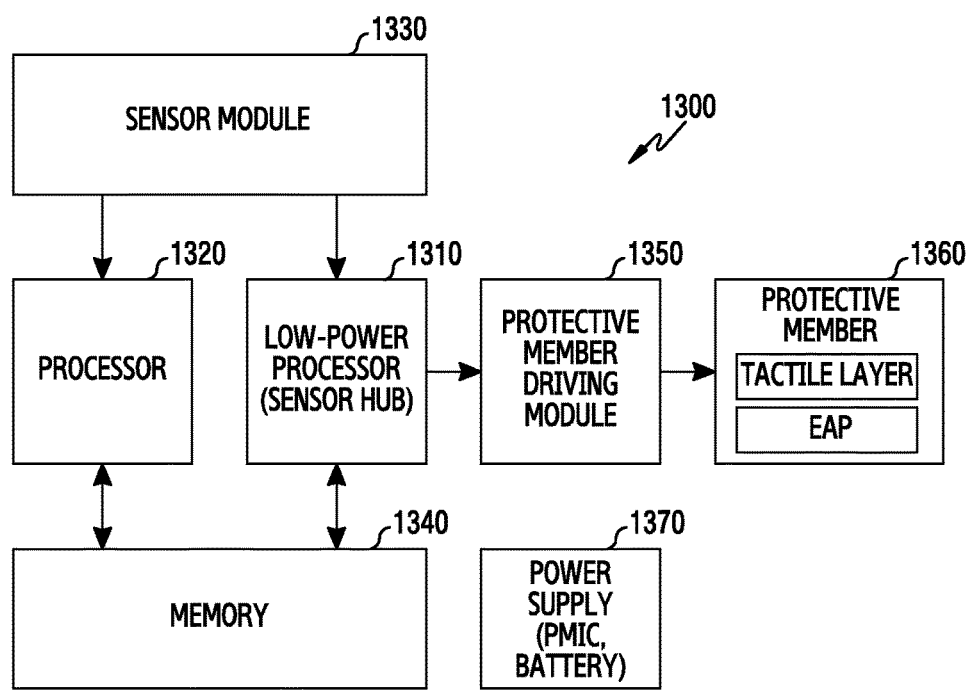
FIG. 13 is a block diagram of an electronic device for activating a protective member according to various embodiments of the present disclosure.

FIG. 13 is a block diagram of an electronic device for activating a protective member according to various embodiments of the present disclosure.

The electronic device 1300 of FIG. 13 may be an embodiment of an electronic device that is similar to, or different from, the electronic devices 101, 201, 300, 400, 500, 600, 700, 800, 900, 1000, 1100, and 1200 according to the embodiments described above.

Referring to FIG. 13, the electronic device may include a processor 1320, a low-power processor 1310, a sensor module 1330 (which may be or include a sensor), a memory 1340, a protective member driving module 1350, a protective member 1360, and a power supply 1370.

According to an embodiment, the processor 1320 may be an embodiment of a processor that is similar to, or different from, the processor 210 of FIG. 2. According to an embodiment, the processor 1320 may drive an operating system or an application program to control a plurality of hardware or software elements connected thereto, and may perform various types of data processing and operations.

The low-power processor 1310 (which may be or include a sensor hub) may be used to activate the protective member 1360, which is included in the electronic device, while the electronic device 1300 is in a sleep state rather than in a wake-up state. According to an embodiment, when a user uses the electronic device, the processor 1320 controls each module, in which case a large amount of current may be consumed. Accordingly, when a user does not use the electronic device 1300, the electronic device 1300 may enter a sleep mode in order to minimize the current consumption of the processor 1310. In this case, the low-power processor 1310 described above may operate in order to monitor the state of the electronic device. According to an embodiment, the low-power processor 1310 may control a necessary module (e.g., a sensor module, a protective member driving module, etc.) with only an infinitesimal amount of current even while the electronic device is in a sleep state.

The sensor module 1330 may detect the motion of the electronic device 1300. According to an embodiment, the sensor module 1330 may include an acceleration sensor, a gyro sensor, etc. According to an embodiment, the acceleration sensor may measure the displacement of the electronic device in the 3-axis (X-, Y-, and Z-axis) directions, and the gyro sensor may measure the amount of rotation of the electronic device in the 3-axis directions.

The low-power processor 1310 may compare sensing information, which is currently detected by the sensor module 1330, with a corresponding reference value based on the information on a threshold value that has been defined in advance for each axis in order to determine the drop of the electronic device 1300 and has been stored in the memory 1340, and may determine that the electronic device has been dropped when the sensing information deviates from the corresponding reference value. According to an embodiment, when it is determined that the electronic device 1300 has been dropped, the low-power processor 1310 may apply a control signal to the protective member driving module 1350 to induce the protective member 1360 to be activated for the change of the shape thereof.

The memory 1340 may be used to load or store various types of programs when the processor 1320 operates, or may log various types of sensor data when the low-power processor 1310 operates. According to an embodiment, the memory 1340 may also load and/or store system variables relating to a program used by the low-power processor 1310 to monitor the drop of the electronic device 1300.

In a case where the protective member 1360 is, for example, a transparent polymer film or an elastomer film that expands upward by fluid to form a raised portion, the protective member driving module 1350 may include: a tactile layer for depositing the fluid; a micro-motor that includes a bellows that presses the fluid toward the protective member from the tactile layer; and a tactile layer controller that controls the micro-motor to be driven under the control of the low-power processor as a sensor module detects the drop of the electronic device.

In a case where the protective member 1360 is, for example, an EAP that changes its shape according to a voltage variation, the protective member driving module 1350 may include a switching module that induces a voltage variation (e.g., $V_0 \rightarrow V_1$) in the EAP, thereby causing the EAP to change shape.

Figure 14:
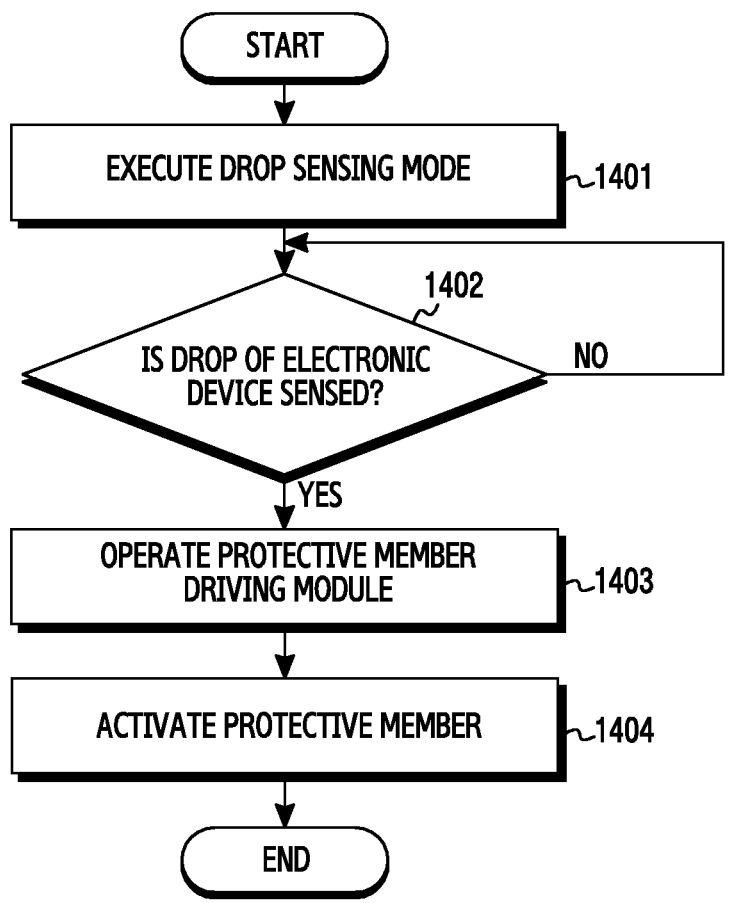
FIG. 14 is a flowchart illustrating a state in which the protective member is activated when the electronic device is dropped, according to various embodiments of the present disclosure.

FIG. 14 is a flowchart illustrating a state in which the protective member is activated when the electronic device is dropped, according to various embodiments of the present disclosure.

Referring to FIG. 14, in operation 1401, the electronic device may execute a mode for sensing the drop of the electronic device. In operation 1402, the electronic device may detect whether the drop of the electronic device is sensed. According to an embodiment, the low-power processor of the electronic device may receive a drop sensing signal from the sensor module (e.g., an acceleration sensor and/or a gyro sensor). According to an embodiment, the low-power processor may compare the sensing information, which is currently detected by the sensor module, with the corresponding reference based on the information on the threshold value that has been defined in advance for each axis in order to determine the drop of the electronic device and has been stored in the memory, and may determine that the electronic device has been dropped when the sensing information deviates from the corresponding reference.

When the drop of the electronic device is sensed in operation 1402, the electronic device may operate the protective member driving module. According to an embodiment, the protective member may be a transparent polymer film or an elastomer film that expands upward by fluid to form a raised portion, and in that case, the low-power processor may control the tactile layer controller to drive the tactile layer. According to an embodiment, the tactile layer controller under the control of the low-power processor may control the micro-motor of the tactile layer to drive the bellows, to press the fluid by the motion of the driven bellows, and to form a raised portion by changing the shape of the protective member. According to an embodiment, in a case where the protective member is an EAP that changes its shape according to a voltage variation, the low-power processor may control the switching module that induces a voltage variation (e.g., $V_0 \rightarrow V_1$) in the EAP.

In operation 1404, the protective member driving module may activate the protective member such that the shape of the protective member is changed. According to an embodiment, the activated protective member may be deformed to form a raised portion, or may be deformed to protrude toward the outside of the electronic device. According to an embodiment, the raised portion or the outwardly protruding portion may serve as a buffer member when the electronic device is dropped.

According to various embodiments, even though an external impact (such as dropping, etc.) is applied to the electronic device, the protective member may perform a buffering action to absorb the impact, thereby contributing to the effective protection of the electronic device.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

What is claimed is:

1. An electronic device comprising:
    at least one protective member disposed in at least a portion of the electronic device;
    at least one sensor configured to detect a drop of the electronic device and to generate a drop sensing signal when the drop is detected;
    a protective member driving module configured to activate the at least one protective member to change a shape of the protective member when the drop of the electronic device is detected; and
    at least one processor configured to receive the drop sensing signal detected by the at least one sensor and to control the protective member driving module to change the shape of the protective member,
    wherein the protective member is stacked on at least a portion of one of a front face and a rear face of the electronic device, and includes at least one of a transparent polymer film and an elastomer film that comprises at least one raised portion that protrudes outward when the drop sensing signal is detected.

2. The electronic device of claim 1, wherein the protective member driving module comprises:
    a tactile layer configured to receive fluid;
    a micro-motor that comprises a bellows configured to press the fluid toward the protective member from the tactile layer; and
    a tactile layer controller configured to drive the micro-motor to press the fluid toward the protective member.

3. The electronic device of claim 2, wherein the fluid is liquid or gas.

4. The electronic device of claim 2, wherein the electronic device further comprises a display disposed in a first area, and the protective member is disposed in an area other than the first area where the display is disposed.

5. The electronic device of claim 1, wherein the sensor comprises at least one of an acceleration sensor and a gyro sensor.

6. The electronic device of claim 1, wherein the processor is a low-power processor configured to operate in a sleep mode of the electronic device.

7. An electronic device comprising:
    at least one protective member disposed in at least a portion of the electronic device;
    at least one sensor configured to detect a drop of the electronic device and to generate a drop sensing signal when the drop is detected;
    a protective member driving module configured to activate the at least one protective member to change a shape of the protective member when the drop of the electronic device is detected; and
    at least one processor configured to receive the drop sensing signal detected by the at least one sensor and to control the protective member driving module to change the shape of the protective member by applying a specific voltage to the protective member,
    wherein the protective member is an Electro Active Polymer (EAP) configured to change its shape to expand toward the outside of the electronic device when the specific voltage is applied thereto.

8. The electronic device of claim 7, wherein the electronic device has one or more corners and the protective member is disposed on at least one of the corners of the electronic device.

9. The electronic device of claim 7, wherein the electronic device has an outer periphery and the protective member is disposed on at least a part of the outer periphery of the electronic device.

10. The electronic device of claim 7, further comprising a bezel part configured to contribute to an outer periphery of the electronic device, wherein the bezel part has openings that are formed therein with a specified interval therebetween, and the openings are filled with the protective member.

11. The electronic device of claim 7, further comprising:
    a housing;
    a bracket disposed in the housing; and
    a window glass attached to an upper surface of the bracket,
    wherein the protective member is disposed in at least one attachment area of the window glass.

12. The electronic device of claim 11, wherein the protective member is disposed in at least one corner area of the electronic device.

13. An operating method in an electronic device, the method comprising:
    detecting a drop of the electronic device; and
    when the drop of the electronic device is detected, operating a protective member driving module to activate a protective member such that a shape of the protective member is changed,
    wherein the protective member is stacked on at least a portion of one of a front face and a rear face of the electronic device, and includes at least one of a transparent polymer film and an elastomer film that comprises at least one raised portion that protrudes outward when the drop of the electronic device is detected.

14. The operating method of claim 13, further comprising:
    controlling a tactile layer controller to form the at least one raised portion on the protective member by pressing a fluid received in a tactile layer toward the protective member,
    wherein the protective member is configured to expand upward by fluid to form the at least one raised portion.

15. The operating method of claim 13, wherein the detecting of the drop comprises:
    determining the drop of the electronic device by comparing a motion parameter detected by a sensor and a threshold value stored in a memory.

16. The operating method of claim 15, wherein the sensor comprises an acceleration sensor and/or a gyro sensor.

17. The operating method of claim 13, wherein the detecting of the drop is performed while the electronic device is in a sleep mode.

18. An operating method in an electronic device, the method comprising:
    detecting a drop of the electronic device; and
    when the drop of the electronic device is detected, controlling a switching module to apply a specific voltage to activate a protective member such that a shape of the protective member is changed,
    wherein the protective member is an EAP that is configured to change its shape when the specific voltage is applied thereto.

\* \* \* \* \*